United States Patent
Nielsen et al.

(10) Patent No.: US 7,742,486 B2
(45) Date of Patent: Jun. 22, 2010

(54) NETWORK INTERCONNECT CROSSPOINT SWITCHING ARCHITECTURE AND METHOD

(75) Inventors: Jacob V. Nielsen, Virum (DK); Claus F. Hoyer, Stokholmsvej (DK); Jacob J. Schroeder, Lyngby (DK)

(73) Assignee: Forestay Research, LLC, Denver, CO (US)

( * ) Notice: Subject to any disclaimer, the term of this patent is extended or adjusted under 35 U.S.C. 154(b) by 1388 days.

(21) Appl. No.: 10/898,540

(22) Filed: Jul. 26, 2004

(65) Prior Publication Data
US 2006/0018329 A1  Jan. 26, 2006

(51) Int. Cl.
*H04L 12/28* (2006.01)
*H04Q 11/00* (2006.01)

(52) U.S. Cl. .................. 370/401; 370/389; 370/351; 370/412; 370/357; 709/226; 709/204; 709/247

(58) Field of Classification Search .................. 370/401, 370/400, 389, 351, 412, 413, 417, 466, 357, 370/381; 709/226, 204, 247, 234
See application file for complete search history.

(56) References Cited

U.S. PATENT DOCUMENTS

| | | | |
|---|---|---|---|
| 5,355,370 A * | 10/1994 | Fairhurst et al. | ............. 370/381 |
| 5,367,520 A | 11/1994 | Cordell | |
| 5,432,908 A | 7/1995 | Heddes et al. | |
| 5,500,858 A | 3/1996 | McKeown | |
| 6,044,061 A | 3/2000 | Aybay et al. | |
| 6,351,466 B1 | 2/2002 | Prabhakar et al. | |
| 6,512,741 B1 * | 1/2003 | Kohzuki et al. | .......... 370/230.1 |
| 6,515,991 B1 | 2/2003 | McKeown | |
| 6,738,381 B1 * | 5/2004 | Agnevik et al. | .......... 370/395.7 |
| 6,944,138 B1 * | 9/2005 | Song | ....................... 370/310.1 |
| 6,956,818 B1 * | 10/2005 | Thodiyil | ..................... 370/230 |

(Continued)

FOREIGN PATENT DOCUMENTS

WO    WO 2004/049174 A    6/2004

OTHER PUBLICATIONS

A. Keshavarzian et al., "Cell Switching vs. Packet Switching," EE384Y: Packet Switch Architectures II, Jun. 2002, pp. 1-9.

(Continued)

*Primary Examiner*—Aung S Moe
*Assistant Examiner*—Jamal Javaid
(74) *Attorney, Agent, or Firm*—SoCal IP Law Group LLP; Steven C. Sereboff; John E. Gunther

(57) ABSTRACT

A network switching system includes transceiver devices respectively provided for a plurality of input line cards. The switching system also includes transceiver devices respective provided for a plurality of output line cards. The switching system further includes a switch device communicatively coupled to each of the plurality of input line cards and the plurality of output line cards. The switch device includes a crosspoint matrix for communicatively connecting one of the input line cards to one of the output line cards. The switch device is capable of operating in either a crosspoint mode for routing cells or packets from one of the input line cards to one of the output line cards, or a scheduler mode for controlling flow of cells and/or packets through at least one other switch device.

18 Claims, 23 Drawing Sheets

U.S. PATENT DOCUMENTS

| | | | |
|---|---|---|---|
| 7,088,710 B1* | 8/2006 | Johnson et al. | 370/357 |
| 7,277,425 B1* | 10/2007 | Sikdar | 370/366 |
| 7,362,751 B2 | 4/2008 | Khacherian et al. | |
| 2001/0021174 A1 | 9/2001 | Luijten et al. | |
| 2002/0051427 A1* | 5/2002 | Carvey | 370/254 |
| 2002/0054568 A1 | 5/2002 | Hoogenboom et al. | |
| 2002/0080775 A1 | 6/2002 | Engbersen et al. | |
| 2002/0118689 A1 | 8/2002 | Luijten et al. | |
| 2002/0145974 A1 | 10/2002 | Saidi et al. | |
| 2002/0152263 A1 | 10/2002 | Goldrian et al. | |
| 2002/0163915 A1 | 11/2002 | Wallner et al. | |
| 2003/0021230 A1 | 1/2003 | Kuo et al. | |
| 2003/0056073 A1 | 3/2003 | Zeiger | |
| 2003/0058802 A1 | 3/2003 | Jones | |
| 2003/0063604 A1 | 4/2003 | Wallner et al. | |
| 2003/0063618 A1 | 4/2003 | Khacherian et al. | |
| 2003/0088694 A1 | 5/2003 | Patek et al. | |
| 2003/0103501 A1 | 6/2003 | Clem et al. | |
| 2003/0117947 A1 | 6/2003 | Koehl et al. | |
| 2003/0118058 A1 | 6/2003 | Kim et al. | |
| 2003/0123469 A1 | 7/2003 | Nong | |
| 2003/0227932 A1 | 12/2003 | Meempat et al. | |
| 2004/0085979 A1 | 5/2004 | Lee et al. | |
| 2004/0093415 A1* | 5/2004 | Thomas | 709/227 |
| 2005/0008011 A1* | 1/2005 | Georgiou et al. | 370/389 |
| 2005/0041970 A1* | 2/2005 | Harai | 398/51 |
| 2006/0031506 A1* | 2/2006 | Redgate | 709/226 |
| 2007/0019674 A1* | 1/2007 | Bourlas et al. | 370/466 |

OTHER PUBLICATIONS

Full Crosspoint Switch, http://216.239.57.104/search?q=W2_0BnSmH08]:www-use, Aug. 26, 2003, 2 pp.

Smart ATM switch self-routes cells, EDN Access—100 Hot Products of 1994, Dec. 1994, 1 page.

Packet-Mode Scheduling in Input-Queued Cell-Based Switches, http://www.comsoc.org/net/public/2002/oct/666_10net05-marsan, Aug. 26, 2003, 1 page.

C, Matsumoto, "Startups look to supersize the switch fabric," EETimes, http://www.eetimes.com/story/OEG20020603S0026, Aug. 26, 2003, pp. 1-3.

* cited by examiner

Egress Serial Link Allocation Status

Ingress Serial Link Allocation Status

Worst-case CQ contention

NETWORK INTERCONNECT CROSSPOINT SWITCHING ARCHITECTURE AND METHOD

BACKGROUND OF THE INVENTION

A. Field of the Invention

The invention relates generally to backplane interconnect switching architectures, and more particularly it relates to an arbitrated crosspoint switching architecture for use within a network switch.

B. Description of the Related Art

Conventional modular backplane interconnect architectures can be classified into three separate groups: 1) shared memory, 2) crosspoint buffered, and 3) arbitrated crosspoint.

In the shared memory architecture, a central switch device implements a relatively large pool of memory (also referred to as a buffer or a memory buffer). Any incoming variable size packet or cell is stored in this buffer until the variable size packet or cell is read from the buffer and forwarded out of the switch device (towards its destination). The buffer is shared by all input and output ports of the central switch device, and the buffer allows for simultaneous reads and writes from all ports. In a scenario where all input ports have simultaneously arriving variable size packets and the memory buffer already holds variable size packets for all output ports, the memory buffer must provide a bandwidth equivalent to the bandwidth of 2N system ports to support full traffic throughout on all ports, where N is the number of ports (N input ports and N output ports equals 2N total input and output ports) of the switch device. This means that memory bandwidth limits the switch capacity per switch device for the shared memory architecture.

The shared memory switch element is typically combined with additional buffering, or queuing, on both ingress and egress line cards, since the amount of buffering it is possible to implement on the central switch chip cannot meet the overall buffer requirements of the system. The queues located on the ingress line cards are typically called virtual output queues (VoQs), which eliminate head-of-line blocking effects, and the amount of buffering required on the egress line cards is influenced by the amount of speedup capacity available in the central switch devices provided, e.g., by redundant switch cards. The memory limitations of the central switch device typically introduce some extra internal control overhead to the overall system.

The shared memory architecture has several advantages including that it can switch both variable size packets and cells in their native format, thereby avoiding having to segment and reassemble a variable size packet into a cell format. It is also easy to ensure that no bandwidth is wasted regardless of the packet or cell size, which minimizes backplane overspeed requirements. Other advantages include that Quality of Service (QoS) capabilities and low latency cut-through switching can relatively easily be provided.

The second type of conventional modular backplane interconnect architecture, the crosspoint buffer architecture, is very similar to the shared memory architecture. However, instead of a single shared memory, the switch device of the crosspoint buffer architecture implements a matrix of buffers with one buffer per input/output combination. This reduces the bandwidth requirements per individual buffer to the equivalent of only two (2) system ports (one input port and one output port), as compared to 2N system ports for the shared memory architecture, which means that memory bandwidth for the crosspoint buffer architecture is less of a constraint as compared to the shared memory architecture.

However, a drawback of the crosspoint buffer architecture is that the number of individual crosspoint buffers is proportional to $N^2$, where N is the number of ports (e.g., N input ports and N output ports) in the switch. Since it is difficult to statistically share memory between the individual crosspoint buffers, the total memory requirements of the crosspoint buffer architecture exceeds that of the shared memory architecture, and the amount of memory and number of memory building blocks per switch device therefore limits the switch capacity per switch device.

Practical implementations also include hybrid shared and crosspoint buffered architectures. In these hybrid architectures, a buffer is shared among a number of crosspoint nodes to achieve the optimal tradeoff between memory bandwidth and memory size requirements from a die size and performance perspective.

For the shared and crosspoint buffered architectures, capacity is scaled using multiple switch devices in parallel. This can be done using byte slicing or by using a flow control scheme between the switch devices to avoid cell or packet re-ordering problems at the output ports. In general, both of these schemes are difficult to scale due to timing constraints and due to the complexity of flow control algorithms.

The crosspoint buffer architecture has similar advantages to those discussed above with respect to the shared memory architecture.

The third type of conventional modular backplane architecture, the arbitrated crosspoint architecture, is based on a crosspoint switch device that provides connectivity between any input to any output, but that does not provide any buffering for traffic as it passes through the crosspoint switch device. The buffering is located on the ingress and egress line cards. The queues located on the ingress line cards are virtual output queues (VoQs), which eliminate head-of-line blocking effects, and the amount of buffering required on the egress line cards is influenced by the amount of speedup capacity available to the central switch device provided, e.g., by redundant switch cards.

The crosspoint portion of the switch device is managed by a scheduler function, which differentiates arbitrated crosspoint architectures from other techniques. The scheduler can either be implemented in a stand-alone device, or integrated into the crosspoint device itself. The latter approach improves the redundancy features and eliminates the need for dedicated communication links between the scheduler and crosspoint switch devices. The scheduler function performs the arbitration process of assigning an input-to-output pair in the crosspoint device. The arbitration decision is updated on a regular time slotted basis, which corresponds to the transmission period of a single fixed sized cell unit of data. The performance, capacity, and QoS support of the arbitrated crosspoint architecture is dependent on the type of scheduling algorithm employed.

The scheduler function can either be performed by a single scheduler unit (centralized) or by multiple schedulers operating in parallel (distributed). The centralized scheduler configures all crosspoints in the system with the result of its crosspoint arbitration decision. A distributed scheduler typically only configures a single crosspoint device with the result of its crosspoint arbitration decision. A centralized scheduler approach typically offers better control of basic QoS features but can be difficult to scale in capacity and number of ports. A distributed scheduler approach can offer improved scalability since the scheduling decisions have reduced timing constraints relative to the centralized scheduler approach, but it introduces synchronization issues among the parallel schedulers.

Compared with the shared memory architecture and the crosspoint buffered architecture, the arbitrated crosspoint architecture scales better since the crosspoint device does not use an integrated memory, and can relatively easily be scaled in capacity by adding crosspoints in parallel.

The configuration of the crosspoint in the arbitrated crosspoint architecture is locked to the arbitration process, such that the arbitration process and the crosspoint configuration is performed on a per timeslot basis. This introduces a cell-tax when the switched data units do not occupy a full timeslot switching bandwidth across a given crosspoint. The majority of scheduler algorithms are a replication or a derivation of the widely adopted iSLIP algorithm developed by Nick McKeown of Stanford University, whereby this algorithm uses an iterative approach to find a good match between inputs and outputs in a timeslot-based arbitration process. See, for example, U.S. Pat. No. 6,515,991, of which Nick McKeown is the listed inventor.

As described above, each of the conventional backplane interconnect architectures has disadvantages. Accordingly, it is desirable to improve the backplane interconnect architecture and to reduce or eliminate the disadvantages of conventional backplane interconnect architectures.

SUMMARY OF THE INVENTION

According to one aspect of the invention, there is provided a network switching device, which includes a plurality of transceiver devices respectively provided for a plurality of input line cards. The device also includes a plurality of transceiver devices respective provided for a plurality of output line cards. The device further includes a switch device communicatively coupled to each of the plurality of input line cards and the plurality of output line cards, the switch device including a crosspoint for communicatively connecting one of the input line cards to one of the output line cards. The switch device is capable of operating in either a crosspoint mode for routing cells or variable size packets from one of the input line cards to one of the output line cards, or for operating in a scheduler mode for controlling flow of cells and/or variable size packets through at least one other switch device.

According to another aspect of the invention, there is provided a network switching device, which includes a plurality of first transceiver devices respectively provided for a plurality of input line cards. The device also includes a plurality of second transceiver devices respectively provided for a plurality of output line cards. The device further includes a switch device communicatively coupled to each of the plurality of input line cards and the plurality of output line cards. The switch device includes a crosspoint matrix for communicatively connecting one of the input line cards to one of the output line cards. The switch device also includes at least one output queue for temporarily storing at least one partial cell or variable size packet output from the crosspoint matrix prior to the at least one cell or variable size packet being sent to one of the output line cards. The switch device outputs the at least one cell or variable size packet based on scheduling commands provided by way of a scheduling unit.

According to yet another aspect of the invention, there is provided a method of switching variable size packets or cells via a switch device, which includes receiving a variable size packet or cell, as received information, from one of a plurality of input line cards communicatively connected to the switch device. The method also includes temporarily storing the received information in an ingress queue of the ingress transceiver, as first stored information. Based on a command provided by a scheduler unit, the method includes outputting the first stored information, as output information, from the ingress queue to a crosspoint unit. The method further includes temporarily storing, if is determined to be required by the switch unit, the output information in an egress queue of the switch device, as second stored information. The method also includes outputting the second stored information, to one of a plurality of output line cards communicatively connected to the switch device.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
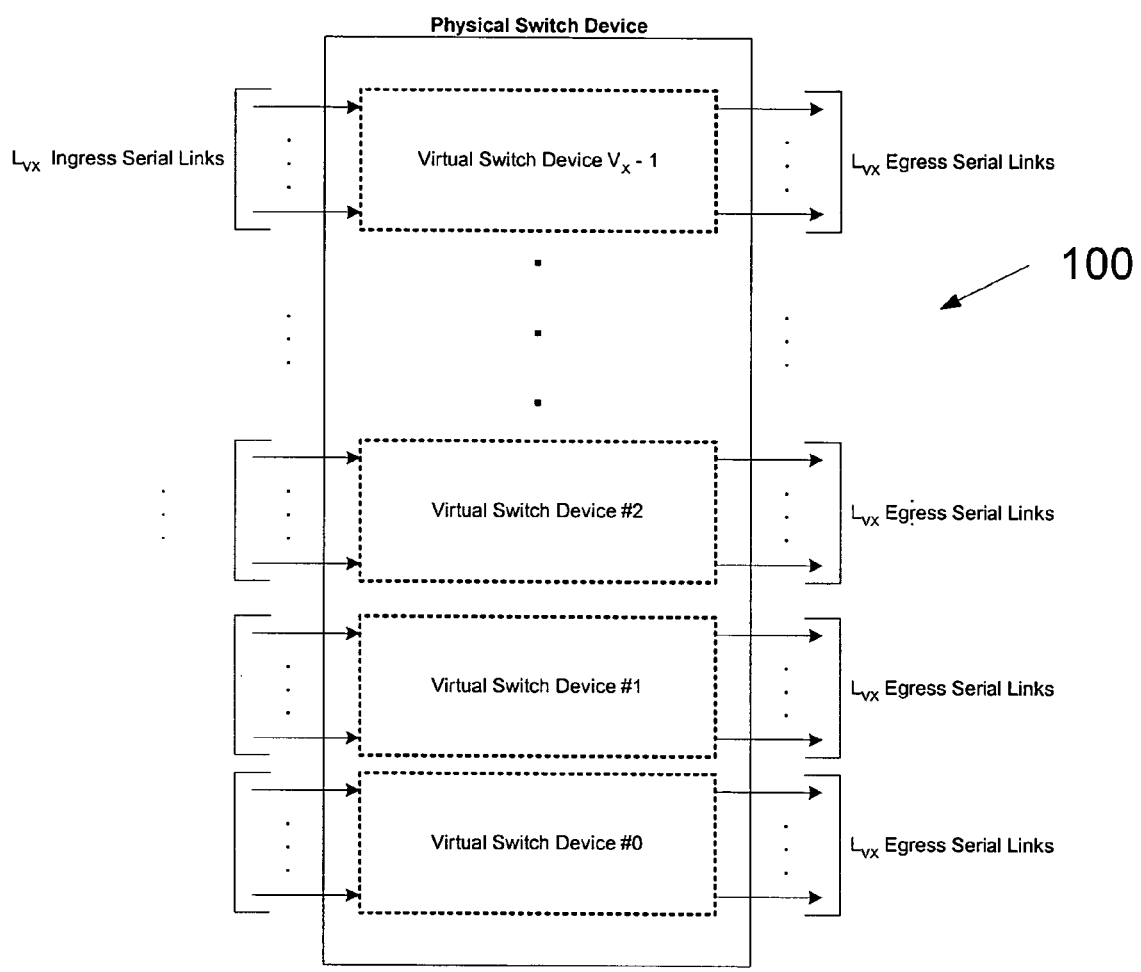
FIG. 1 shows a switch device configured as a number of independent virtual switch devices, according to at least one aspect of the invention.

Different embodiments of the present invention will be described below with reference to the accompanying figures. Each of these different embodiments are combinable with one or more other embodiments to produce additional embodiments of the invention. An aspect of present invention provides a backplane interconnect architecture that has the attractive benefits of the shared memory architecture, while greatly reducing concerns about scalability into the terabit capacity range in standard single chassis form factors.

Briefly stated, at least one embodiment of the present invention is directed to a crosspoint, which is managed by a scheduler that performs a crosspoint arbitration process, similar to the conventional arbitrated crosspoint architecture. In contrast to the conventional arbitrated crosspoint architecture, however, the crosspoint according to at least one embodiment of the invention implements a buffer structure that traffic passes through. This buffer structure according to at least one embodiment of the invention is different from a shared memory architecture and a crosspoint buffer architecture in structure and in purpose, and is constructed such that it does not limit scalability due to memory constraints. Accordingly, the embodiments of present invention are much different than any of the conventional backplane interconnect architectures.

According to at least one embodiment of the present invention, a scheduler arbitration process is performed on variable size packet units, and combining the scheduler arbitration process with the buffer structure of the crosspoint ensures that bandwidth is not wasted when switching variable size packets across the crosspoints regardless of the packet size. This is different than a conventional arbitrated crosspoint architecture where a cell-tax is introduced due to a timeslot-based scheduler operation.

According to at least one embodiment of the present invention, an interconnect architecture provides for back-to-back switching of variable size packets across crosspoints, using a central scheduler to distribute the traffic across the parallel crosspoints. The combination of the central scheduler, buffers per ingress serial link in the ingress transceiver and buffers per egress serial link in the crosspoint to absorb overlapping packet tails, and a flow control mechanism to synchronize the central scheduler and these buffers, effectively provides efficient byte-level scheduling and back-to-back switching of variable size packets across parallel crosspoints.

Since the crosspoint buffers used in accordance with at least one embodiment of the invention are relatively much smaller than the conventional shared memory type full-length packet buffers, the crosspoint latency variation (e.g., due to the size of the buffer) is comparably negligible and the amount of packet sequence re-ordering memory that is needed to compensate for the load balancing is therefore also very low. Also, synchronous operation of the crosspoints and the scheduler is not required, since the crosspoint buffers can absorb non-synchronous timing, and since the crosspoints themselves route the variable size packets from inputs to outputs of the crosspoint.

According to at least one embodiment of the invention, variable size packets can be distributed and switched back-to-back across parallel crosspoints, requiring only very small amounts of packet buffering per crosspoint egress serial link and no over-speed requirements to compensate for cell-tax or cell-timeslot alignment (e.g., the packet tail problem).

The central scheduling algorithm and tight timing synchronization requirements are traditionally the primary bottlenecks for achieving fully efficient utilization of the serial links in an arbitrated crosspoint switching system. The complexity of even the simplest scheduling algorithms cannot be executed at a speed equivalent to the transmission of a byte unit and the scheduler-to-crosspoint synchronization cannot be performed with byte level granularity. The scheduling and scheduler-to-crosspoint timeslot synchronization is therefore typically performed at intervals corresponding to one cell unit of data (e.g., one cell equals 40 bytes or 80 bytes), which leads to inefficient utilization of switching capacity when a variable size packet does not equal an integer number of cell units.

According to at least one embodiment of the invention, a central scheduler schedules a variable size packet for an ingress and an egress serial link while ignoring the variable size packet tail when estimating the size of the variable size packet to be scheduled. When variable size packets have a tail, i.e., where the size of the variable size packet is not an integer multiple of a fixed size unit (e.g., a cell unit of data), variable size packets may collide when they arrive at ingress or egress serial links. An embodiment of the present invention provides a "collision" buffer per ingress and egress serial link, which absorbs (e.g., is capable of simultaneously holding some or all data from multiple packets output by the crosspoint matrix) the collision without any loss of information, and forwards the variable size packets back-to-back with byte-level granularity towards a destination. If data accumulates in the collision buffers due to variable size packet tails not accounted for by the scheduler, a relatively simple flow control mechanism is used to temporarily halt the central scheduling mechanism, using "tick" flow control messages. This effectively provides scheduling with byte level granularity, even though the scheduler only needs to perform scheduling decisions per serial link on a standard cell-timeslot basis.

The collision buffers mitigate the tight clock level timing requirements otherwise required between the scheduler operation and corresponding crosspoint configuration.

Further, according to at least one embodiment, a scheduler is capable of maintaining multiple outstanding requests per destination, whereby these requests can be assigned to one or more of the parallel crosspoints in a load balancing operation. The scheduler accordingly represents multiple outstanding requests in a compact representation, which minimizes gate counts for a circuit implementing the scheduler functions.

Still further, connection-oriented switching according to at least one embodiment of the invention is capable of providing support for cut-through switching. Also, the central scheduler and flow control operation according to at least one embodiment ensures that the amount of congestion per crosspoint output has a small upper limit, and thus substantial buffering per crosspoint is not required.

The lists of acronyms and definitions provided in Table 1 are helpful in understanding the description of the various embodiments of the invention. This list of acronyms and definitions provides a general description, and is not intended to be limiting on the present invention, as these terms may have other meanings as are known to those skilled in the art.

TABLE 1

| | Glossary of Terms |
|---|---|
| Bit | A unit of information used by digital computers. Represents the smallest piece of addressable memory within a computer. A bit expresses the choice between two possibilities and is represented by a logical one (1) or zero (0). |
| Byte | An 8-bit unit of information. Each bit in a byte has the value 0 or 1. |
| Collapsed Packet | The resulting logical packet entity when the transceiver collapses packets or when the scheduler collapses packet requests. |
| Control Record | A link layer data unit, which is transmitted on control serial links. |
| Control Serial Link | A serial link connecting a transceiver to a scheduler. |
| Crosspoint | A virtual switch device operating in crosspoint mode |
| Crosspoint Mode | A virtual switch device mode of operation, see Crosspoint. |
| Cut-Through Switching | A low-latency packet switching technique, where the packet switching can begin as soon as the packet header has arrived. |
| Data Serial Link | A serial link connecting a transceiver to a crosspoint. |
| Egress | The direction of the information flow from the virtual switch devices to the egress transceiver user interface via the egress serial links and egress transceiver. |
| Egress Port | A logical transmission channel, which carries data across the transceivers egress user interface. See also Port. |
| Egress Serial Link | A simplex serial electrical connection providing transmission capacity between two devices. |
| Egress Tick | An egress serial link flow control command. |
| Egress Transceiver | The part of a physical transceiver device, which handles the forwarding of data from the virtual switch devices to the egress user interfaces. |
| Egress User Interface | The part of a user interface, which transfers packets in the egress direction. See also User Interface. |
| Head of Line (HOL) | Refers to the element positioned as the next outgoing element in a FIFO mechanism. |
| Ingress | The direction of the information flow originating from the ingress user interfaces to the virtual switch devices via the ingress serial links and ingress transceiver. |
| Ingress Serial Link | A simplex serial electrical connection providing transmission capacity between two devices. |
| Ingress Tick | An ingress serial link flow control command. |
| Ingress Transceiver | The part of a physical transceiver device, which handles the forwarding of data from the ingress user interfaces to the virtual switch devices. |
| Ingress User Interface | The part of a user interface, which transfers packets in the ingress direction. See also User Interface. |
| Long Connection | A switch connection established to accommodate the switching of a long packet |
| Long Packet | A packet of size $Long_{Min}$ bytes or more |
| Long Release | The ingress serial link flow control mechanism that can generate Long Release commands. |
| Packet | One variable sized unit of binary data, which is switched transparently across the system |
| Packet Per Second (pps) | Applied to packet streams. This is the number of transmitted packets on a data stream per second. Prefix M or G (Mega or Giga) |
| Packet Tail | The remaining packet size when excluding the maximum number of fixed size N-byte units that the packet can be divided into. |
| Parts per Million (ppm) | Applied to frequency, this is the difference, in millionths of a Hertz, between some stated ideal frequency, and the measured long-term average of a frequency. |
| Physical Switch Device | A physical device, which can be logically partitioned into multiple virtual switch devices. The physical switch device is typically located on the switch cards in a modular system. |
| Physical Transceiver Device | A physical device, which is divided into two logical components: Ingress and an Egress Transceiver. The transceiver device is typically located on the line cards in a modular system. |
| Port | A logical definition of users traffic streams, which enter and exit the switching system via the physical transceiver device. A port can provide QoS services and flow control mechanisms for the user. |
| Quality of Service (QoS) Class | A QoS class of service definition, which may include strict priority, weighted allocations, guaranteed bandwidth allocation service schemes, as well as any other bandwidth allocation service scheme. |
| Quality of Service (QoS) Priority | A strict priority level associated with each QoS class definition. |

TABLE 1-continued

Glossary of Terms

| | |
|---|---|
| Scheduler | A virtual switch device operating in scheduler mode |
| Scheduler Mode | A virtual switch device mode of operation, see Scheduler. |
| Serial Link | A serial electrical connection providing transmission capacity between a transceiver and a virtual switch device, which includes an ingress and egress serial link. |
| Short Connection | A switch connection established to accommodate the switching of a short packet |
| Short Packet | A packet of size ($Long_{Min}$ − 1) bytes or less |
| Store-and-Forward Switching | A packet switching technique, where the packet forwarding (switching) can begin once the entire packet has arrived and has been buffered. |
| User Interface | A physical interface on the physical transceiver device, across which packet can be transferred in both the ingress and egress direction. See also Ingress User Interface and Egress User Interface. |
| Virtual Output Queue (VoQ) | A data queue representing an egress port, but which is maintained on the ingress side of the switching system. |
| Virtual Switch Device | A logical switch element, which can operate, for example, either as a crosspoint or as a scheduler. See also "Physical Switch Device". |
| Word | An N-bit (e.g., 16 bit, 32 bit, etc.) unit of information. Each bit in a byte has the value 0 or 1. |

The parameter definitions included in Table 2 are used in the description of the various embodiments of the invention provided herein.

TABLE 2

Parameter Definitions

| Parameter Name | Parameter Definition | Unit |
|---|---|---|
| $L_T$ | Number of serial links per physical transceiver device. | Integer |
| $L_{VX}$ | Number of serial links per virtual switch device. | Integer |
| $L_X$ | Number of serial links per physical switch device. | Integer |
| $V_X$ | Number of virtual switch devices per physical switch device | Integer |
| $Request_{Min}$ | The smallest packet unit, which a transceiver can request the scheduler to allocate an ingress and egress serial link switching connection for. | Bytes |
| $ET_{Size}$ | Egress Tick size. When an Egress Tick arrives at the scheduler it causes the scheduler to halt allocation of the corresponding egress serial link for a period of time equivalent to $ET_{Size}$ on the egress serial link. | Bytes |
| $IT_{Size}$ | Ingress Tick size. When an Ingress Tick arrives at the scheduler it causes the scheduler to halt allocation of the corresponding ingress serial link for a period of time equivalent to $IT_{Size}$ on the ingress serial link. | Bytes |
| $Tail_{Max}$ | The maximum packet tail size | Bytes |
| $T_{ILQ}$ | An ILQ threshold used by the ingress serial link flow control long release command signaling. | Bytes |
| $R_{ILQ}$ | The maximum number of bytes that can be found in an ILQ queue when a new packet acknowledge for the ILQ arrives at the ingress transceiver (R is short for residual) | Bytes |
| $CQ_L$ | The number of lanes per CQ, which is also equal to the maximum number of arriving packets each CQ can accept overlapping each other. | Integer |
| $CQ_{LS}$ | The maximum number of packet bytes that can be buffered per CQ lane. | Bytes |
| $VoQ_{Reqs}$ | The maximum allowed number of pending requests (i.e. waiting to receive a corresponding acknowledge from the scheduler) per VoQ. Is also equal to the maximum number of requests per scheduler unicast/multicast request queue. | Integer |
| $Long_{Min}$ | Minimum size for a long packet counted in bytes | Bytes |
| $D_{LR-Data}$ | The maximum number of bytes transmitted on a ingress serial link in a period of time defined by the latency in the following transceiver to scheduler communication loop: Starting when an ingress serial link flow control long release command is forwarded from the ingress transceiver to the scheduler, the scheduler performs a scheduling decision and the corresponding acknowledge is transferred back to an ingress transceiver and the corresponding packet readout from the VoQ to ILQ to ingress serial link is initiated. | Bytes |
| $D_{Tick-Ack}$ | The maximum period of time it takes from when an ingress transceiver generates an Ingress Tick and sends it to the scheduler until the serial link timer value embedded in an acknowledge message received by the ingress transceiver is certain to reflect that Ingress Tick. | Bytes |

TABLE 2-continued

Parameter Definitions

| Parameter Name | Parameter Definition | Unit |
|---|---|---|
| $D_{CQ}$ | The maximum number of bytes transmitted on a egress serial link in a period of time defined by the latency in the following transceiver to scheduler communication loop: Starting from when a CQ stops generating egress serial link flow control ticks, the scheduler resumes scheduling of the serial link and a packet consequently enters the crosspoint. | Bytes |

The switch interconnect architecture according to a first embodiment of the invention provides backplane connectivity and switching functionality between line cards and switch cards that may be disposed, for example, in a modular slotted chassis. By way of example and not by way of limitation, these cards are connected via electrical serial link electrical traces running across a passive chassis printed circuit board (PCB) backplane.

According to at least one embodiment of the invention, switch cards are responsible for the switching and exchange of data between the line cards. The line cards are connected with high-speed serial links to the switch cards. Each switch card implements one or more switch devices to perform the actual switching function.

The number of switch cards found in the system according to the first embodiment depends on the type of system redundancy utilized, if any. In a system without any redundancy of the switching function, typically only one switch card is provided. With a 1:1, N+1 or N+M redundancy scheme, two or more switch cards are provided.

The line cards utilized in a preferred construction of the first embodiment implement one or more optical and/or electrical-based user chassis I/O interfaces that the user will typically connect to via the front panel of the chassis.

The backplane interconnect system that is utilized in a preferred construction of the first embodiment includes two different devices: a physical transceiver device and a physical switch device. One or more physical transceiver devices are implemented per line card. One or more physical switch devices are implemented per switch card.

An explanation will now be provided with regard to how these two devices are interconnected to provide a complete backplane interconnect system according to the first embodiment.

A switch device can be configured as a number of virtual switch devices, which may be independent from one another. For example, a single physical switch device is partitioned into $V_X$ virtual switch devices, with $L_{VX}$ ingress and egress serial links per virtual switch device. Such a switch device 100 is illustrated in FIG. 1, which includes Virtual Switch Devices $0, 1, \ldots, V_x-1$.

At least one, or preferably each, physical switch device in the backplane interconnect system according to the first embodiment is partitioned into the same number ($V_x$, which is an integer) of virtual switch devices $0$-$V_x$-1. Each virtual switch device is connected to $L_{vx}$ ingress serial links and $L_{vx}$ egress serial links, whereby $L_{vx}$ is an integer greater than or equal to one.

Each virtual switch device utilized in the first embodiment can operate in one of the following two modes of operation: a) Crosspoint mode, which switches packets from ingress to egress serial links; or b) Scheduler mode, which generates scheduling decisions for other virtual switch devices operating in the crosspoint mode.

As an example, one of the virtual switch device implemented in the system operates as a scheduler in the scheduler mode, while all of the other virtual switch devices in the system operate as crosspoints in the crosspoint mode. Other configurations are possible while remaining within the scope of the invention.

For larger systems, a physical switch device may correspond to a single virtual switch device, which operates in either scheduler mode or in crosspoint mode. For smaller systems, a physical switch device can be partitioned into multiple virtual switch devices.

Figure 2:
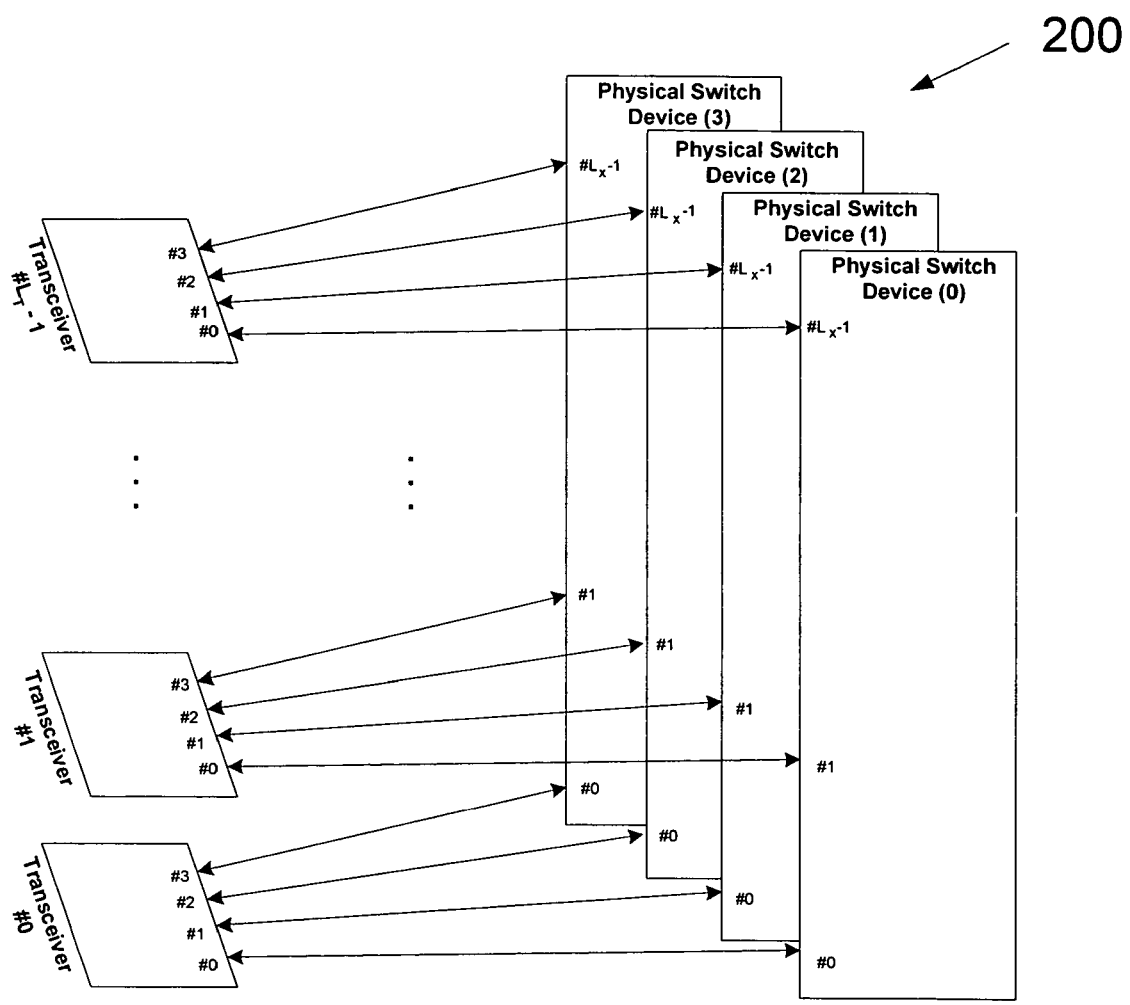
FIG. 2 shows an interconnect topology for a system having parallel physical switch devices, in accordance with at least one aspect of the invention.

FIG. 2 shows the serial link connectivity, i.e., the interconnect topology, for an example system 200 constructed in accordance with the first embodiment. The system 200 has four parallel physical switch devices 0, 1, 2, 3, each physical switch device implemented with one virtual switch device. Note the correspondence numbering of the serial links on the transceivers $0$-$L_T$-1, and the parallel physical switch devices 0, 1, 2, 3. In this implementation, one transceiver (#0, #1, . . . , or #$L_T$-1) is capable of outputting packets to each of the four physical switch devices 0, 1, 2, 3, under control of a scheduler.

Figure 3:
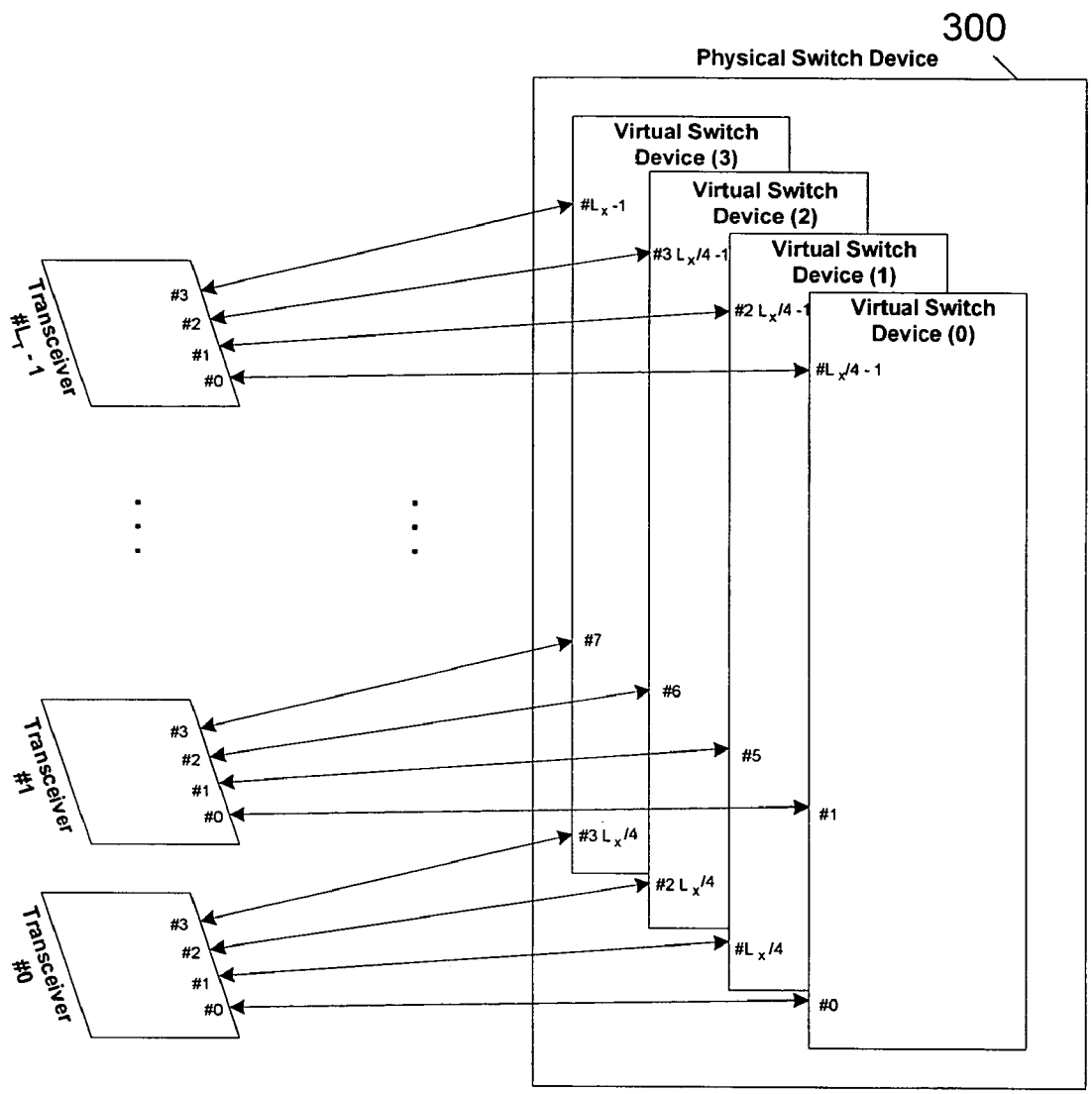
FIG. 3 shows an interconnect topology for a system having parallel virtual switch devices that correspond to a single physical switch device, in accordance with at least one aspect of the invention.

FIG. 3 shows the serial link connectivity for an example system constructed in accordance with the first embodiment having four parallel virtual switch devices, whereby the four parallel virtual switch devices correspond to a single physical switch device 300. Note the correspondence numbering of the serial links on the transceivers $0$-$L_T$-1, and the numbering of the parallel switch devices 0, 1, 2, 3.

A transceiver connects one serial link to one virtual switch device. Each of the transceivers is not required to connect to the same number of virtual switch devices. Transceivers supporting less traffic throughput relative to other transceivers in the systems are not required to be connected to all virtual switch devices.

In a preferred construction of the first embodiment, the serial links on a transceiver operate with the same serial link speed and physical layer encoding overhead, but multiple physical layer encodings schemes can also be implemented for the same transceiver.

In a preferred construction of the first embodiment, a reference clock per device is externally provided. There is no requirement for distribution of a common or partial shared reference clock in the system and method according to the first embodiment, since each transceiver or switch device can operate from their own local reference clocks.

Figure 4:
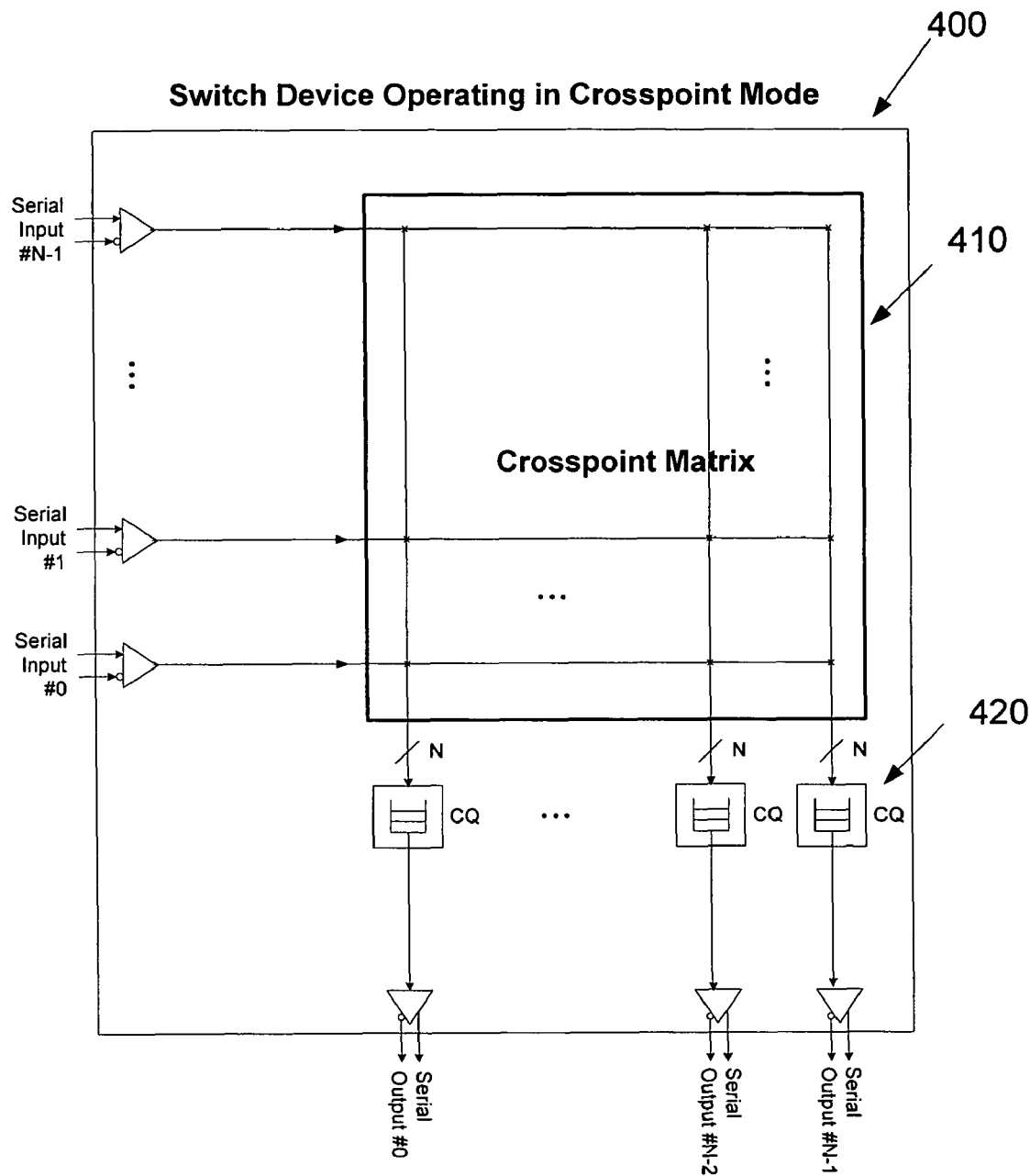
FIG. 4 is a functional block diagram of a switch device according to at least one aspect of the invention that is operating in the crosspoint mode.

FIG. 4 is a functional block diagram of a virtual switch device 400 that may be utilized in a system according to a preferred construction of the first embodiment, where the switch device operates in the crosspoint mode (herein also referred to as a crosspoint device). The switch device is connected to N serial inputs (also referred to as ingress serial links) and N serial outputs (also referred to as egress serial links). The switch device includes a crosspoint matrix 410, and N crosspoint queues (CQs) 420 on the output side of the crosspoint matrix (the CQs are also referred to herein as "output queues", whereby the CQs may be implemented as a memory storage device that stores packets and that outputs the stored packets according to a particular scheme). The crosspoint matrix 410 provides connectivity between all inputs and outputs, as shown in FIG. 4. An input driver is used to forward packets from each ingress serial link to a corresponding input port of the crosspoint matrix, in a manner known to those skilled in the art. An output driver is used to provide packets from each crosspoint queue to a corresponding egress serial link, in a manner known to those skilled in the art.

Figure 5:
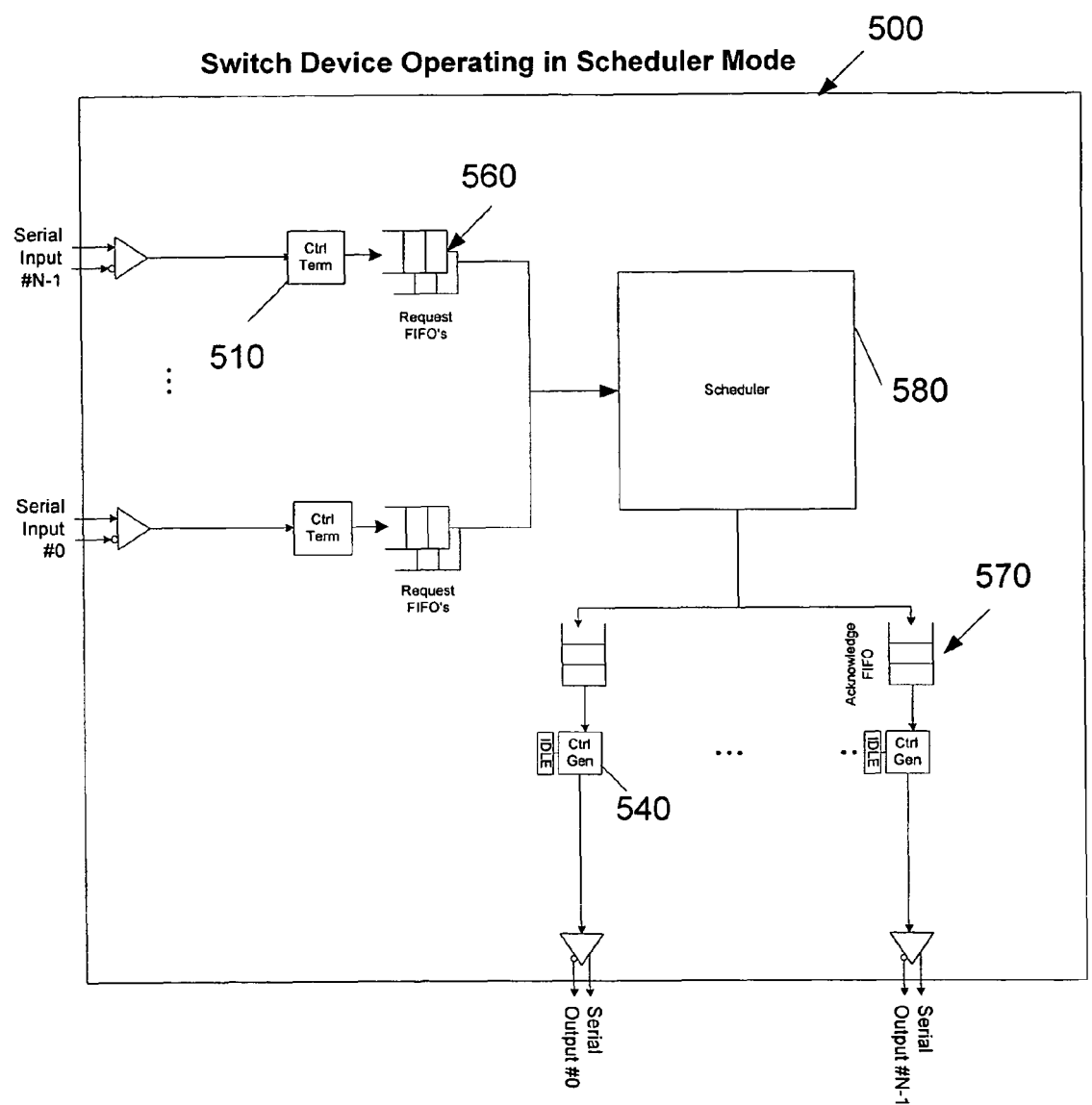
FIG. 5 is a functional block diagram of a switch device according to at least one aspect of the invention that is operating in the scheduler mode.

FIG. 5 is a functional block diagram of a virtual switch device 500 that may be utilized in the system according to a preferred construction of the first embodiment, where the virtual switch device operates in the scheduler mode. It includes N Control Record Termination units 510 on the input side of the crosspoint matrix 410, and N Control Record Generation units 540 on the output side of the crosspoint matrix 410 (whereby N is an integer representing the number of inputs and outputs of the crosspoint matrix 410). The switch device 500 also includes for each of the N inputs, a number of request FIFOs 560 equal to the number of VoQs in the corresponding ingress transceiver, N acknowledge FIFOs 570, and a Scheduler Unit 580. The Scheduler Unit 580 performs scheduling for the crosspoint units, such as by utilizing a variation of the iterative scheduling algorithm of N. McKeown discussed earlier.

The backplane interconnect system according to a preferred construction of the first embodiment supports two modes of switching operation at the system level, which are:

a) Ingress port to egress port store-and-forward switch mode b) Ingress port to egress port cut-through switch mode Regardless of the selected switch mode, the switch architecture internally is capable of performing cut-through switching along a path from the ingress transceiver to the egress transceiver for both unicast and multicast packets. This way, packets can be transferred as quickly as possible across the crosspoints.

The queuing structures implemented in an ingress transceiver, an egress physical transceiver, and a scheduler, in a preferred construction of the first embodiment, is described in detail below.

The ingress transceiver implements the following queues for packet buffering and transmission:

VoQ (Virtual Output Queue)
ILQ (Ingress Serial Link Queue)

The egress transceiver implements the following queues for packet buffering and transmission:

ERQ (Egress Reordering Queue)
EPQ (Egress Port Queues)

The crosspoint implements the following queues for packet switching and transmission:

CQ (Crosspoint Queue)

Figure 6:
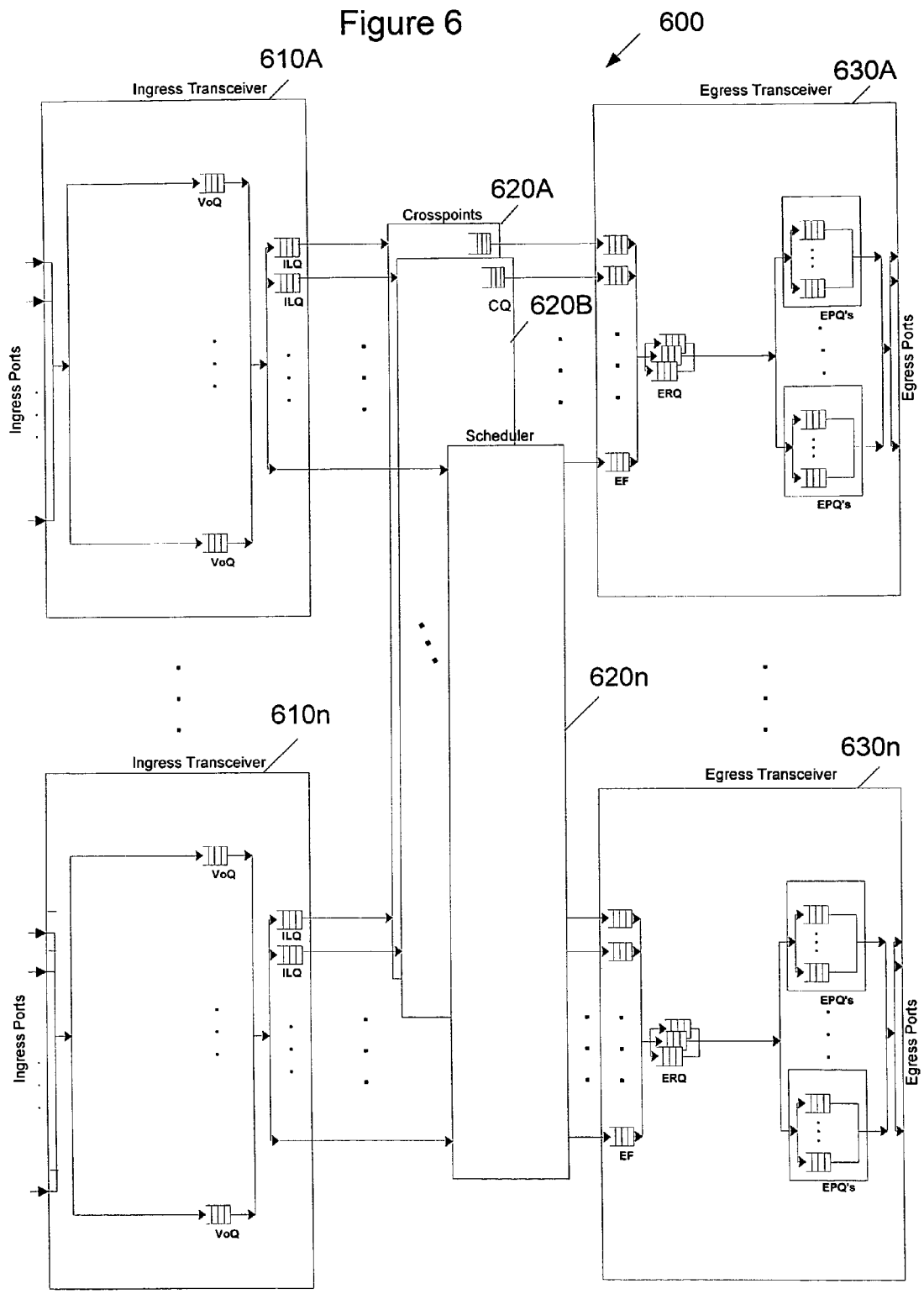
FIG. 6 shows a system level overview of a queuing system according to at least one aspect of the invention.

A system level overview of the queuing system according to a preferred implementation of the first embodiment is shown in FIG. 6. In FIG. 6, crosspoints 620A, 620B, ..., 620n-1 and scheduler 620n are part of a single physical switch device (or corresponding parts of several physical switch devices). An incoming packet arrives at an ingress port and is directly coupled to an ingress transceiver. The incoming packet is received at an ingress transceiver 610A, ..., or 610n and is stored in a VoQ, where the packet awaits transfer to a crosspoint 620A, ..., or 620n-1 under command of the scheduler 620n. Based on a scheduling decision made by the scheduler 620n, a packet is output from the VoQ to an ILQ (also referred to herein as "input FIFO"), and it is then provided to a corresponding crosspoint 620A, ..., or 620n-1, to be then switched self-routing through the crosspoint matrix of the crosspoint and to be then stored in a corresponding CQ at the output side of the crosspoint. The packet is then output from the CQ to a designated egress transceiver 630A, ..., or 630n. Each egress transceiver 630A, ..., 630n comprises an EPQ, whereby a packet is then output from a corresponding egress transceiver to an egress port directly coupled to the egress transceiver, and the packet is sent on its way to its eventual destination.

Figure 7:
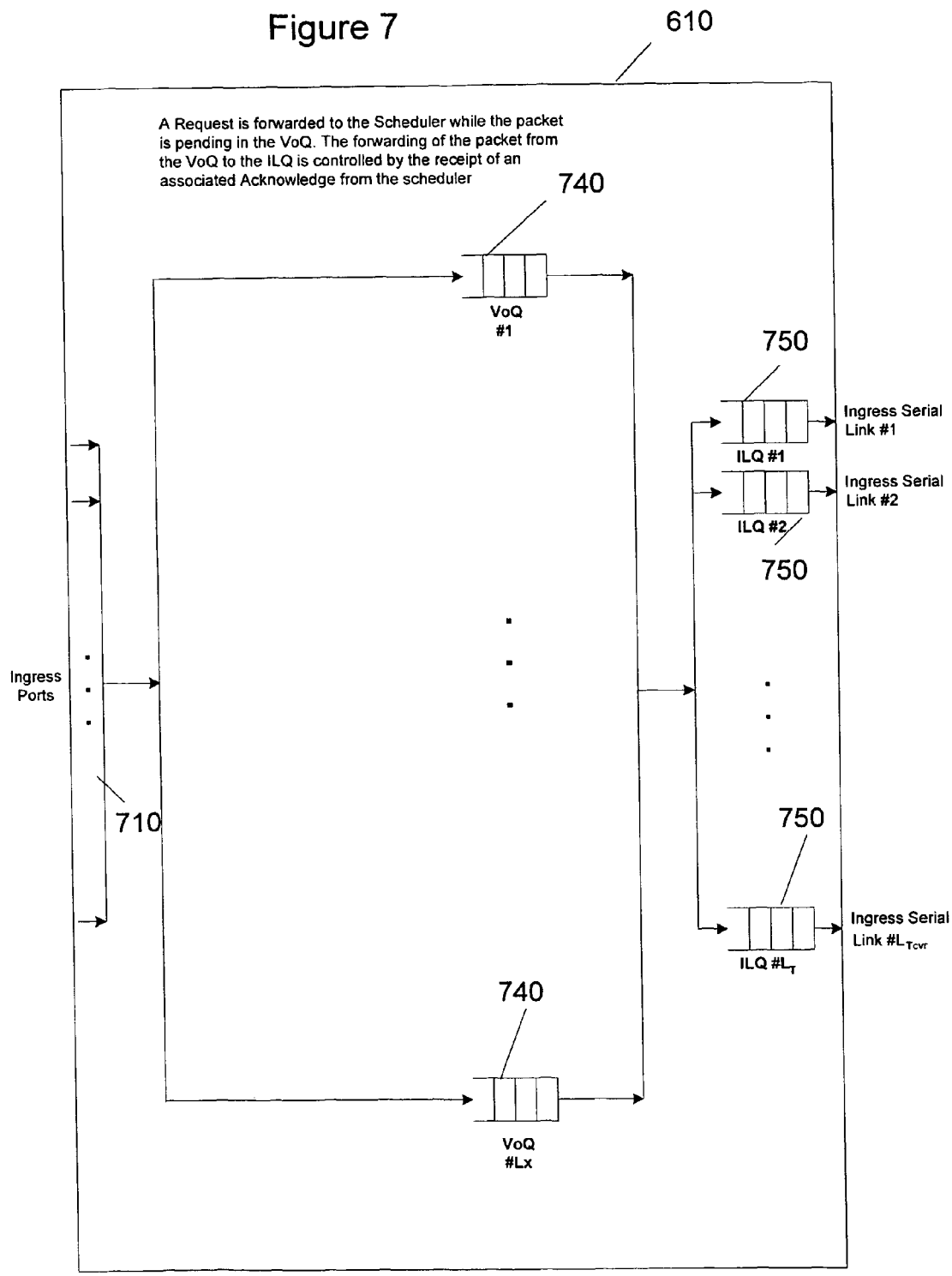
FIG. 7 shows a queue structure of an ingress transceiver according to at least one aspect of the invention.

The queue structure of an ingress transceiver 610 is shown in FIG. 7. When a packet arrives at an ingress transceiver port 710, it is assigned a buffer memory location and written into a buffer memory (not shown), and a pointer to that buffer location is passed to a VoQ 740, and eventually to an ILQ 750 by exchanging packet pointers. Once the packet gets forwarded across the ingress serial link, the packet is removed from the buffer memory.

A unicast packet entering the ingress transceiver is written into a buffer memory. Preferably, as quickly as possible, it is determined whether the packet is long or short (as defined by $Long_{Min}$), and the packet is then qualified for forwarding to the VoQ corresponding to its destination port and associated QoS class as defined by any scheduler algorithms implemented in the central scheduler and transceiver units.

For packets in a VoQ, the ingress transceiver forwards a request to the scheduler, when the following conditions are met:

1. The current number of pending requests for the VoQ is less than $VoQ_{Reqs}$. The value of $VoQ_{Reqs}$ is defined depending on the required latency and jitter packet switching performance for the individual VoQs.

2. The size of the packets for which a corresponding request is currently pending is within a defined range. The value of this range is defined depending on the required latency and jitter packet switching performance for the individual VoQs.

Figure 11:
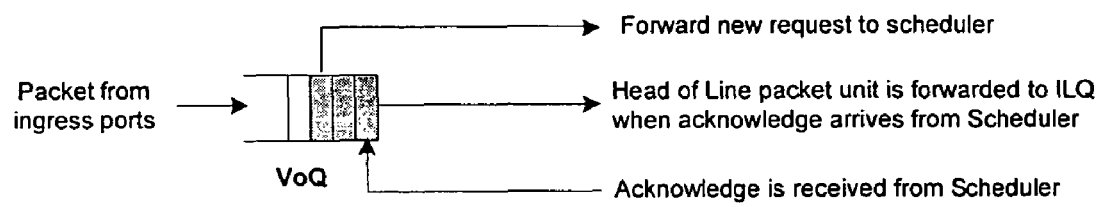
FIG. 11 shows an example of a request and acknowledge handshake according to an aspect of the invention.

The forwarding of the packets from the VoQs to the ILQs is controlled by the scheduler via the acknowledge messages transmitted from the scheduler to the VoQ of the ingress serial link in response to the request. FIG. 11 shows an example of a Request and Acknowledge handshake. In FIG. 11, a new packet enters the VoQ, and a new request is forwarded to the scheduler for that new packet. Also, a head-of-line packet unit is forwarded to the ILQ when an acknowledge arrives from the scheduler at the VoQ.

In a preferred construction of the first embodiment, unicast packets are forwarded one-by-one from the unicast Virtual Output Queues (VoQs) to the ILQs corresponding to the order that the unicast acknowledge messages are received from the scheduler.

On the other side of the crosspoint unit, the egress transceivers perform re-ordering of the packets, if necessary, to ensure that the original packet sequence is maintained on a per <port, QoS class> basis. The egress transceiver re-ordering function is based on a sequence ID, which is carried by every packet as it is switched across the crosspoints. The ingress transceiver devices maintain and "stamp" the sequence IDs into the packets. The sequence IDs preferably only need to be maintained on a per transceiver basis (not per port and/or QoS class).

Preferably, a sequence ID counter is incremented each time a packet is transferred from its associated VoQ to an ILQ, and the sequence IDs therefore completely correspond to the packet sequence dictated by the flow of acknowledge messages from the scheduler to the ingress transceiver. In a preferred construction of the first embodiment, a packet is sequence ID "stamped" when it leaves the VoQ, and not when it leaves the ILQ.

When multiple packets have been collapsed into a single packet by the ingress transceiver or the scheduler, only the resulting collapsed packet receives a sequence ID "stamp". A sequence ID counter is incremented and stamped into the collapsed packet when the corresponding acknowledge arrives at the ingress transceiver, and the collapsed packet is transferred from its associated VoQ to an ILQ. The sequence IDs of such collapsed packets therefore completely correspond to the packet sequence dictated by the flow of acknowledges from the scheduler to the ingress transceiver.

An Ingress Serial Link queue (ILQ) is implemented for each ingress serial link. Each ILQ can accept packets at the performance dictated by the scheduler generating the acknowledge messages, and is capable of mapping packets back-to-back onto the corresponding ingress serial link in FIFO order regardless of packet size, thereby fully utilizing the bandwidth on its corresponding ingress serial link.

The size of the ILQ is preferably determined based on an analysis of worst case ILQ contention. In any event, the size of the ILQ is preferably very small.

A description will now be made of a transceiver packet collapsing function that may be utilized in the first embodiment. The scheduler operation ensures efficient back-to-back switching of packets, for packets that are at least Request$_{Min}$ bytes long when transmitted on a serial link. To also support effective switching of packets smaller than Request$_{Min}$ bytes, the transceiver is capable of collapsing these packets into larger packets.

The transceiver unicast packet collapse function is performed per VoQ. When a unicast packet is inserted into an VoQ, it is collapsed with the last packet in the VoQ if the following conditions are met:
 a) The incoming packet is smaller than Request$_{Min}$ bytes, or the size of the current last packet in the VoQ is smaller than Request$_{Min}$ bytes, where the last packet in the VoQ may itself include packets that have previously been collapsed.
 b) The current last packet in the VoQ includes no more than $T_{Col}-1$ collapsed packets, where $T_{Col}$ is an integer value greater than one.
 c) A Request for the current last packet in the VoQ has not yet been generated and forwarded to the scheduler.

The transceiver multicast packet collapse function is performed per VoQ. When a multicast packet is inserted into an VoQ, it is collapsed with the last packet in the VoQ if the following conditions are met:
 a) The incoming packet's egress transceivers destination fanout is identical to the egress transceiver fanout of the current last packet in the VoQ.
 b) The incoming packet's size is smaller than Request$_{Min}$ bytes, or the size of the current last packet in the VoQ is smaller than Request$_{Min}$ bytes, where the last packet in the VoQ may itself include packets which have previously been collapsed.
 c) The current last packet in the VoQ includes no more than $T_{Col}-1$ collapsed packets.
 d) A Request for the current last packet in the VoQ has not yet been generated and forwarded to the scheduler.

Figure 8:
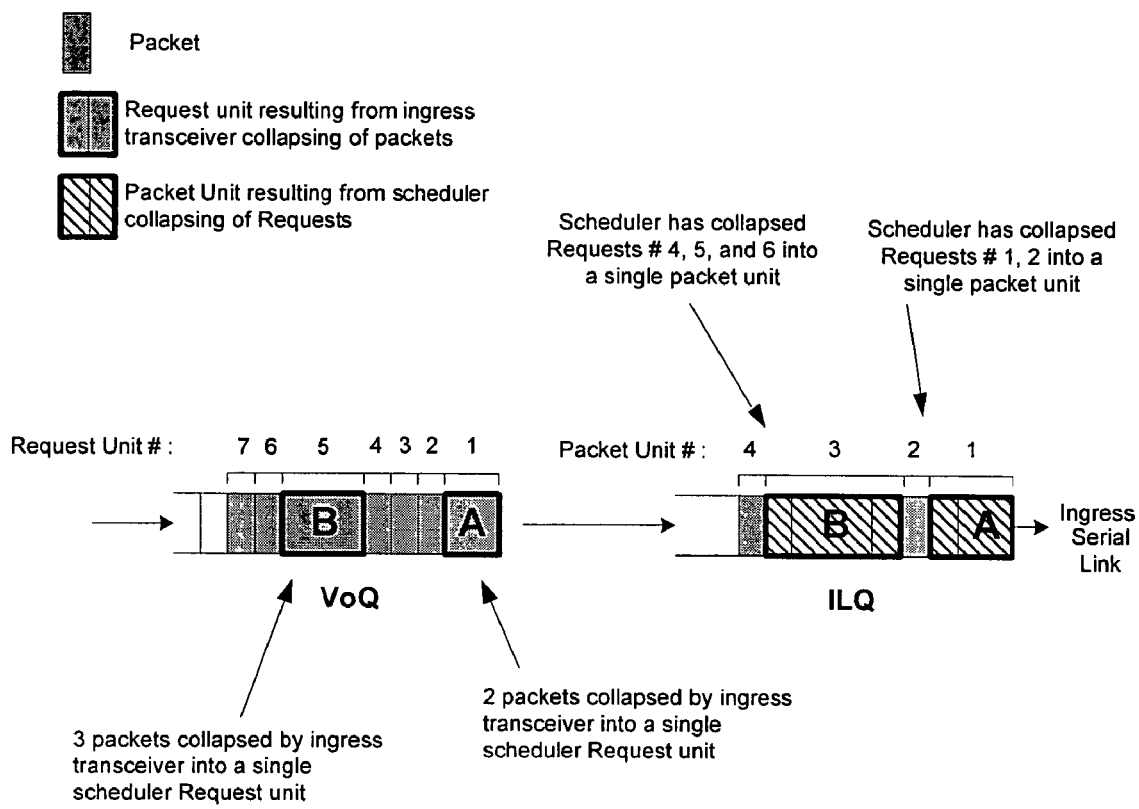
FIG. 8 shows an example of transceiver packet collapsing and scheduler request collapsing according to an aspect of the invention.

An example of VoQ packet collapsing is shown in FIG. 8, where the scheduler collapses requests 4, 5, and 6 into a single equivalent packet unit in the ILQ and where the scheduler collapses requests 1 and 2 into a single equivalent packet unit in the ILQ. Prior to the collapsing by the scheduler, an ingress transceiver has collapsed 2 VoQ packets as shown by label "A", and collapsed 3 VoQ packets as shown by label "B". Only a single request is sent to the scheduler for the "A" collapsed packets, and only a single request is provided for the "B" collapsed packets.

Figure 9:
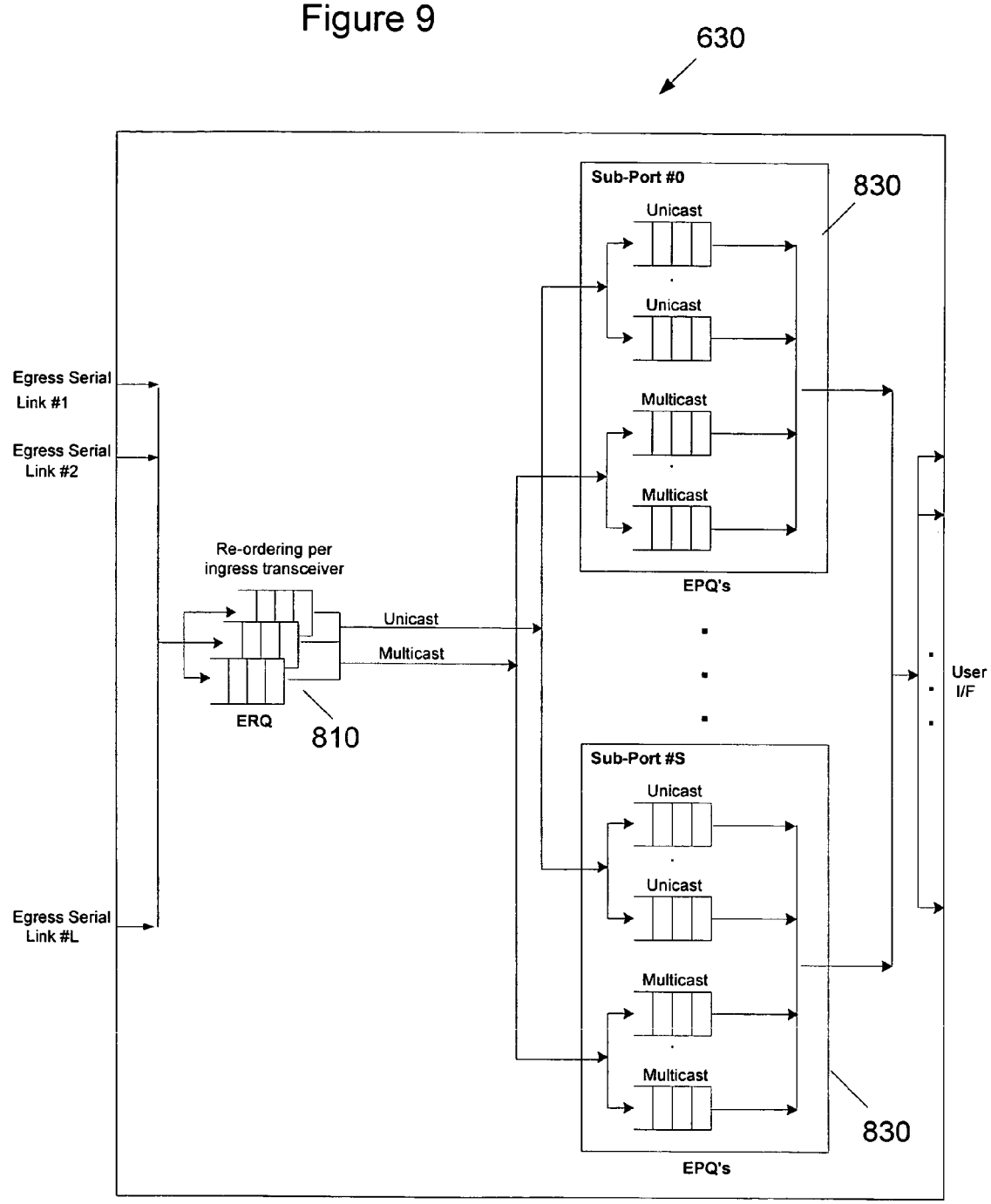
FIG. 9 shows a structure of an egress transceiver according to at least one aspect of the invention.

The logical structure of the queues of an egress transceiver according to a preferred construction of the first embodiment is shown in FIG. 9.

When a unicast or multicast packet arrives at the egress transceiver 630, it is assigned a buffer memory location, and written into buffer memory (not shown), with a pointer to that buffer memory location being passed to an ERQ 810. Then, the packet is moved to an EPQ 830 by exchanging packet pointers between these queues.

Since packets can experience different delays as they are switched across parallel crosspoints, for example, due to experiencing different ILQ and CQ fill levels. The egress transceiver may need to perform packet sequence re-ordering to ensure that the original packet sequence is maintained on a per <port, QoS class> basis between the systems ingress and egress ports.

Since the ILQs and CQs are sized so as to be shallow queues in a preferred construction of this embodiment, the delay variation across the crosspoints is small. The re-ordering can therefore be performed per <ingress transceiver>, as opposed to per <ingress transceiver port, QoS class>, since the latency contributions from the ERQ 810 is insignificant from a QoS class and port fairness perspective.

The packet buffer capacity of the CQ is preferably determined based on worst case CQ contention scenarios, though, in any event, the size of the CQ is relatively small compared to queue structures found in conventional shared memory architecture type switch devices (e.g., typically in the range from 100 bytes to 1400 bytes).

The egress transceiver maintains an Egress Port Queue (EPQ) 830 per QoS class or group of classes per transceiver port for both unicast and multicast traffic.

When the transceiver is operating in store-and-forward switch mode, the packet is qualified for readout and final forwarding across the egress port once the entire packet is stored in the egress memory buffer. When the transceiver is operating in cut-through switch mode, the packet is qualified for final forwarding across the egress port as described previously.

Figure 10:
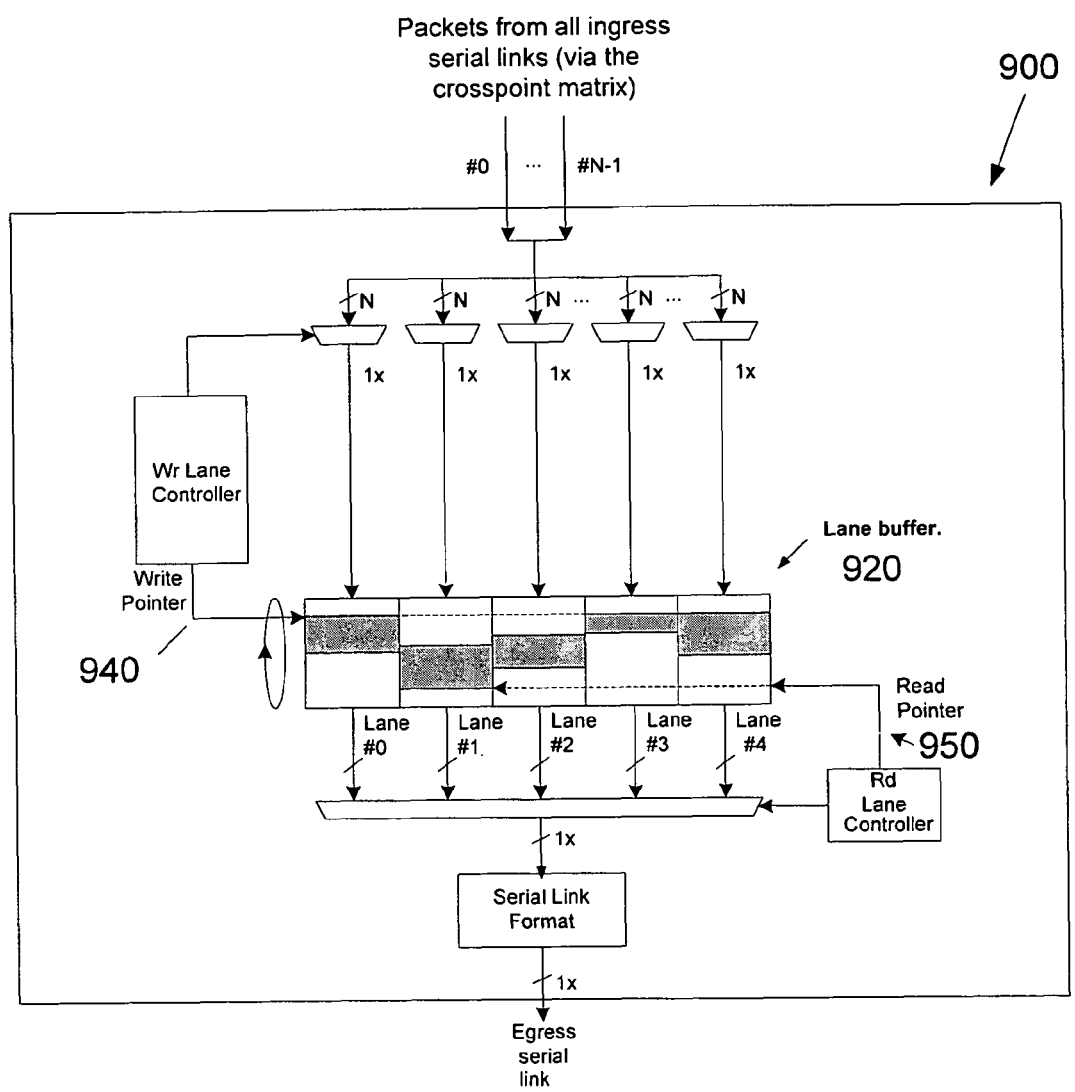
FIG. 10 shows a structure of a crosspoint queue according to at least one aspect of the invention.

Preferably, one CQ is implemented per egress serial link in the crosspoint. A CQ buffers unicast and multicast packets, and can accept up to $CQ_L$ packets arriving overlapping each other from any of the crosspoint inputs, where $CQ_L=6$ in the preferred construction regardless of the number of crosspoint inputs. Of course, other values for $CQ_L$ may be contemplated while remaining within the scope of the invention. The packets are forwarded out of the CQ towards its corresponding egress serial link one at a time. FIG. 10 shows one possible structure of a CQ 900, where $CQ_L=5$.

The lane buffer structure 920 of the CQ 900 is preferably implemented with dual ported single clocked memories where the data words are structured as $CQ_L$ parallel lanes with a write cycle disable input per lane, and where each data word can be marked as empty per lane.

When a packet arrives at the CQ 900 it is assigned an empty lane, if one is available. If the assigned lane runs full, the packet is assigned an additional empty lane, and so forth until the entire packet is written in the CQ 900. A single packet can therefore occupy all $CQ_L$ lanes, and no more than one packet can occupy one lane. Each lane supports a throughput equivalent to the maximum serial link speed and holds up to $CQ_{LS}$ bytes.

To prevent CQ overflow during normal operation, the following very conservative CQ size ($CQ_{LS}$) dimensioning guideline may be adopted. For example, dimensioning of each lane is made so as to ensure that a short packet never occupies more than a single CQ lane. This means that $CQ_{LS}$ is defined as the maximum size short packet including packet tails, which is a function of $Long_{Min}$. This dimensioning guideline provides more buffer space than what is required based on a worst case CQ contention scenarios, which may be acceptable depending on the specific implementation.

In a preferred implementation, a lane buffer write pointer 940 is incremented every clock cycle, and any packet word is written into a particular lane buffer identified by the write pointer 940 regardless of the lane. Once the readout of a packet has been initiated, it will continue until the last byte of the packet has been read, and lane change may occur during the readout process.

A packet is read out from one or more of the lanes of the CQ 900 in the order they are qualified for readout. In a preferred construction of the first embodiment, short packets are immediately qualified for readout, while long packets are not qualified for readout until at least $CQ_{L-Q}$ bytes or the entire packet has been written into the lane buffer, where $CQ_{L-Q} = R_{ILQ}$.

This ensures that, in the scenario where a short packet followed by a long packet is scheduled for transmission across the same egress serial link, the packet order is maintained even when the short packet experiences a maximum ILQ delay and the long packet experiences a minimum ILQ delay. In one possible implementation, an additional amount (e.g., 40 bytes) is added to the qualification threshold to accommodate for variations in serial link transmission delays and internal synchronization between different clock domains in the crosspoint.

When readout of a packet is initiated, the lane buffer read pointer 950 is set equal to the lane buffer address of the beginning of the packet, and is incremented in every clock cycle until the packet readout is completed.

When a physical switch device is partitioned into multiple virtual switch devices, each serial link in the physical switch device has an associated programmable base address offset. When a packet enters a crosspoint, this offset is added to the destination transceiver identified by the packet header, and the resulting number represents the egress serial link across which the crosspoint will transmit the packet out of the physical switch device. This is a very easy and simple method for partitioning a switch device into multiple virtual crosspoints. An example of a single switch device partitioned into multiple virtual crosspoints is shown in FIG. 1.

The scheduling function performed by a switch device when operating in scheduler mode, according to a preferred construction of the first embodiment, is described in detail below.

The control serial link protocol is running on the serial links connecting the transceivers with the scheduler, and exchanges ingress transceiver queue status information and scheduler decisions between the devices.

The data serial link protocol is running on the serial links connecting the transceivers with the crosspoints, and includes a small header per packet carrying packet-addressing information used by the crosspoints and egress transceiver queue systems. Each ingress transceiver is capable of forwarding multiple packets simultaneously across multiple parallel crosspoints, such that full throughput can be achieved when the transceiver traffic capacity exceeds the serial link speed.

In a preferred implementation, packets are switched using a 'one packet per serial link' protocol, combined with a connection-oriented scheduling mechanism. When a packet is to be switched, the first step is the establishment of a dedicated serial link connection from the ingress transceiver to the packet's destination egress transceiver. Then follows the actual transport of the packet across one of the crosspoints via the established data serial link connection. Finally, once the tail of the packet is about to leave or has already left the ingress transceiver, the serial link connection is removed. This type of connection is referred to as a "long connection."

The delay associated with the tear down of a long connection and establishment of a new connection is equivalent to the serial link transmission period for a packet of size $Long_{Min}$. So to achieve full throughput in terms of packets per second and bandwidth utilization, a special scheduler mechanism is utilized for packets shorter than $Long_{Min}$. For such packets, the scheduler automatically de-allocates these serial link connections when a predetermined period of time, such as based on the size of the short packet, has elapsed. This contrasts with de-allocating the connection only when a termination notification has been received from the ingress transceiver. This latter type of serial link connection is referred to as a "short connection."

Congestion may occur at the ingress serial link queues (ILQ) and egress serial links queues (CQ) for the following reasons:

a) Short connection scheduler decisions are performed ignoring the packet tail, since the packet sizes included in the requests forwarded to the scheduler by the transceivers does not include the packet tail.

b) Long connections are de-allocated in advance such the long packets tails may overlap with the following transmitted packets.

c) The scheduler is allowed to perform slightly overlapping scheduling decisions.

d) Packets experience different delays as they are forwarded out of the ingress transceiver towards one of the crosspoints.

To accommodate for egress serial link congestion, the crosspoint outputs packets to a small queue per egress serial link (where the small queue is called a CQ). When traffic is accumulated in such a crosspoint queue, the crosspoint sends a flow control command (Egress Tick) to the scheduler via the transceiver device, and the scheduler then delays any re-allocation of the egress serial link for a small period of time. To accommodate for ingress serial link congestion, the ingress transceiver implements a small queue per ingress serial link (ILQ). When traffic is accumulated in such an ingress transceiver queue, the ingress transceiver sends a flow control command (Ingress Tick) to the scheduler, and the scheduler then delays any re-allocation of the ingress serial link for a small period of time.

The scheduler algorithm used according to a preferred implementation is an iterative matching algorithm, but it does not operate on a traditional time slotted basis where the serial link switching resources are aligned to time slot boundaries. Instead, the serial link resources are made available to the scheduler as soon as they become available, and the scheduler is allowed to perform overlapping scheduling decisions to prevent a serial link from sitting idle while the scheduler calculates the next scheduling decision. The scheduler preferably includes requests queues, grant arbiters, and accept arbiters to arbitrate between packet requests. The scheduler preferably maintains a serial link state table spanning all serial links in the entire system, which defines when a serial link is available for a new scheduling decision.

The crosspoint queue's (CQ) fill level determine the switching delay across the crosspoint. The flow control mechanism operating between these CQs and the scheduler ensures an upper bound on the latency and fill level of the CQ.

A switching connection includes a switch path across an ingress and egress serial link pair to facilitate the switching of a packet. The scheduler supports the following two connection types:
  a) Short connections. A short connection is requested for packets shorter than $Long_{Min}$. The scheduler will allocate the ingress and egress serial link(s) for a period of time equivalent to the packet size ignoring any packet tail (because the size of the corresponding Request did not include any packet tail), which may cause the corresponding short packet to overlap with the previous packet at both the ingress and egress serial link.
  b) Long connections. A long connection is requested for packets that are equal to, or longer than $Long_{Min}$. The transceiver will request the scheduler to de-allocate the connection when only $T_{ILQ}$ bytes remain in the ingress serial link ILQ, which may cause the corresponding long packet to overlap with the next packet at both the ingress and egress serial link.

A description will now be made of the flow of information between the transceiver and scheduler related to the establishment of serial link connections.

When a unicast packet arrives at a VoQ, a unicast connection request is immediately forwarded to the scheduler in the following format:
  Unicast Connection request: <Transceiver, Size, QoS>, where:
    [Transceiver]=An integer number defining the destination transceiver.
    [Size]=A specific size of a short packet ($Request_{Min} \leq Size < Long_{MIN}$) excluding any packet tail, or an unknown size long packet ($Long_{MIN}$).
    [QoS]=The QoS priority of the packets pending for acknowledgement in the VoQ.
  Once the scheduler has granted a serial link connection for a unicast packet, it will send an acknowledge back to the transceiver. The acknowledge has the following format:
  Unicast acknowledge: <Switch, Transceiver, Size, Timer>, where:
    [Switch]=The virtual switch device across which the unicast packet shall be switched.
    [Transceiver]=An integer number defining the destination transceiver and VoQ.
    [Size]=A specific size short packet ($Request_{Min} \leq Size < Long_{MIN}$), or an unknown size long packet ($Long_{MIN}$).
    [Timer]=The value of ingress serial link allocation state variable Timer, just before the acknowledge was generated and Timer was updated accordingly. This field is used by the ingress serial link flow control function.

After receipt of the acknowledge, forwarding of the corresponding unicast packet from the VoQ to the ILQ begins immediately.

Since the scheduler attempts to collapse short connection requests with other short or long connection requests, the ingress transceiver may receive an acknowledge for a connection that does not match the size of the current VoQ HOL packet. When this happens, the ingress transceiver calculates how many connections requests the scheduler collapsed, and then forwards all of these as a single packet unit with multiple embedded packets to the ILQ.

A description will now be made of the request and acknowledge communication flow for a multicast VoQ, which is the same as the communication flow for a unicast VoQ, except that the format of the request and acknowledge is different and multiple acknowledges may be generated as a result of a single request.

When a multicast packet arrives at a VoQ, a multicast connection request is immediately forwarded to the scheduler in the following format:
  Multicast Connection request: <Multicast ID, Size, QoS>, where:
    [MulticastID]=The multicast ID associated with the multicast packet.
    [Size]=A specific size of a short packet ($Request_{Min} \leq Size < Long_{MIN}$) excluding any packet tail, or an unknown size long packet ($Long_{MIN}$).
    [QoS]=The QoS priority of packets pending for acknowledgement in the VoQ.
  Once the scheduler has granted a serial link connection for a multicast packet, it will send an acknowledge back to the transceiver. The multicast acknowledge has the following format:
  Multicast acknowledge: <Multicast ID, Switch, Size>, where:
    [MulticastID]=The multicast ID associated with the multicast packet.
    [Switch]=The virtual switch device across which the multicast packet shall be switched
    [Size]=A specific size short packet ($Request_{Min} \leq Size < Long_{MIN}$), or an unknown size long packet ($Long_{MIN}$).
    [Timer]=The value of ingress serial link allocation state variable Timer, just before the acknowledge was generated. This field is used by the ingress serial link flow control function.

After receipt of the acknowledge, forwarding of the HOL multicast packet from the VoQ to the ILQ begins immediately. FIG. 11 shows an example of a Request and Acknowledge handshake.

The scheduler attempts to collapse multicast requests, just as it attempts to collapse unicast requests, but only before the first acknowledge for a specific request is transmitted.

Figure 12:
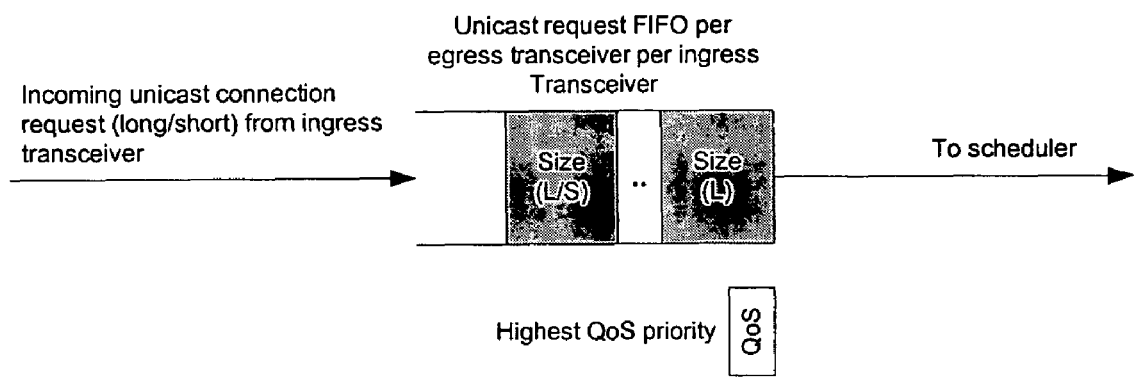
FIG. 12 shows a scheduler's request FIFO structure according to an aspect of the invention.

The scheduler implements a unicast request FIFO for each VoQ in the system. The unicast request FIFO structure is shown in FIG. 12. The unicast request FIFO is dimensioned to hold a number of requests equal to the maximum allowed number of outstanding requests in the corresponding unicast VoQ in the ingress transceiver ($VoQ_{Reqs}$). The entries in the request FIFO are long connection requests, except the last FIFO entry that can be either a short connection request of a specific size ($<Long_{Min}$) or a long connection request ($\leq Long_{Min}$). This is ensured because the scheduler preferably always attempts to collapse incoming connection requests with previous requests, which has the advantage that the number of logic gates required to implement the request FIFO is significantly reduced, and that the required scheduler performance is reduced since switching of larger packets in general requires less scheduler matching efficiency than switching of smaller packets.

When a new connection request (short or long) arrives, one of the two following two actions occurs:
  a) If the last entry in the connection request FIFO is a long request, the incoming connection request is added to the connection request FIFO as a new entry.
  b) If the last entry in the connection request FIFO is a short request, it is collapsed with the incoming connection request. The size of the incoming request is added to the size of the last entry, and if the result of the addition is ≦$Long_{Min}$, the last entry is converted to a long request.

Each unicast request FIFO also maintains a QoS variable. The QoS variable is preferably set equal to the QoS priority of the last incoming request. The request FIFO structure can be implemented with a low gate count using the following variables:
a) The number of FIFO entries.
b) The size of the last FIFO connection request entry, which is a specific size short packet, or an unknown size long packet ($Long_{MIN}$).
c) The QoS priority of the packet requests.

The scheduler implements one multicast request FIFO per ingress transceiver, as well as a single multicast request queue from which multicast requests are forwarded to the scheduler.

Figure 13:
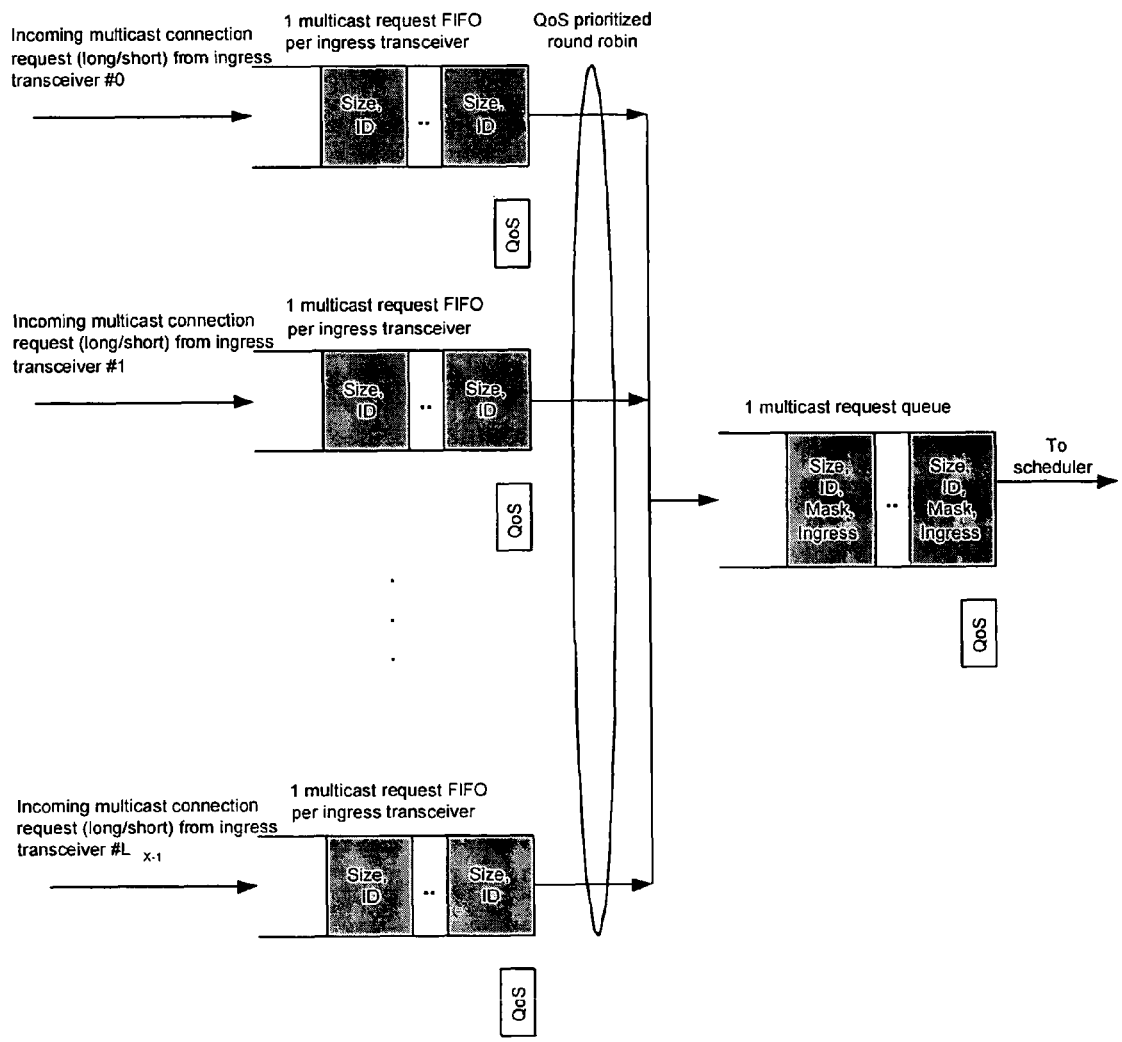
FIG. 13 shows a scheduler's multicast request FIFO and multicast request queue structure according to at least one aspect of the invention.

In a system with $L_{VX}$ serial links per virtual switch, the scheduler therefore maintains $L_{VX}$ multicast request FIFOs plus a single multicast request queue. The multicast request FIFO and multicast request queue structure is shown in FIG. 13.

The multicast request FIFO is identical to the unicast request FIFO except that:
a) Each entry in the multicast request FIFO can be either short or long and each entry also holds the multicast ID associated with the request.
b) In addition to the unicast collapsing rules, the incoming request can only be collapsed with the last entry in the multicast request FIFO if the two multicast IDs are identical.

In this embodiment, while the multicast request FIFO collapse mechanism does not save any significant number of logic gates required to implement the FIFO, the system aggregate multicast pps performance is improved when bursts of short packets sharing the same multicast ID are switched.

Requests in the multicast requests FIFOs are not scheduled directly by the scheduler. Instead there is a multicast request queue where requests from all multicast requests FIFOs are stored, and from which the multicast request queue forwards the multicast requests to the scheduler, as shown in FIG. 13. Requests are forwarded from the request FIFOs to the request queue by a strict priority round robin scheduler discipline according to the request FIFO's QoS priority variables, by maintaining a round robin pointer per strict priority, as shown in FIG. 13.

When a request is inserted into the multicast request queue, a multicast fanout bit mask where each entry corresponds to an egress transceiver is added to the request entry. Transceivers included in the multicast ID's fanout are marked in a fanout bit mask ("Mask" in FIG. 13). The multicast fanout mask generation is performed with a lookup in a multicast ID fanout mask table memory. The ingress transceiver that generated the request is also added to the request. The multicast request queue supports collapsing of requests in a manner identical to the collapsing performed by the multicast request FIFO with the additional rule that the packet's ingress transceiver must be identical.

The scheduler maintains allocation status per serial links in the system, and utilizes and updates the allocation status as it processes connection requests and schedules switch connections. The relationship between serial link allocation statuses, scheduler algorithm, and ingress and egress serial link flow control is shown in FIG. 14.

Figure 14:
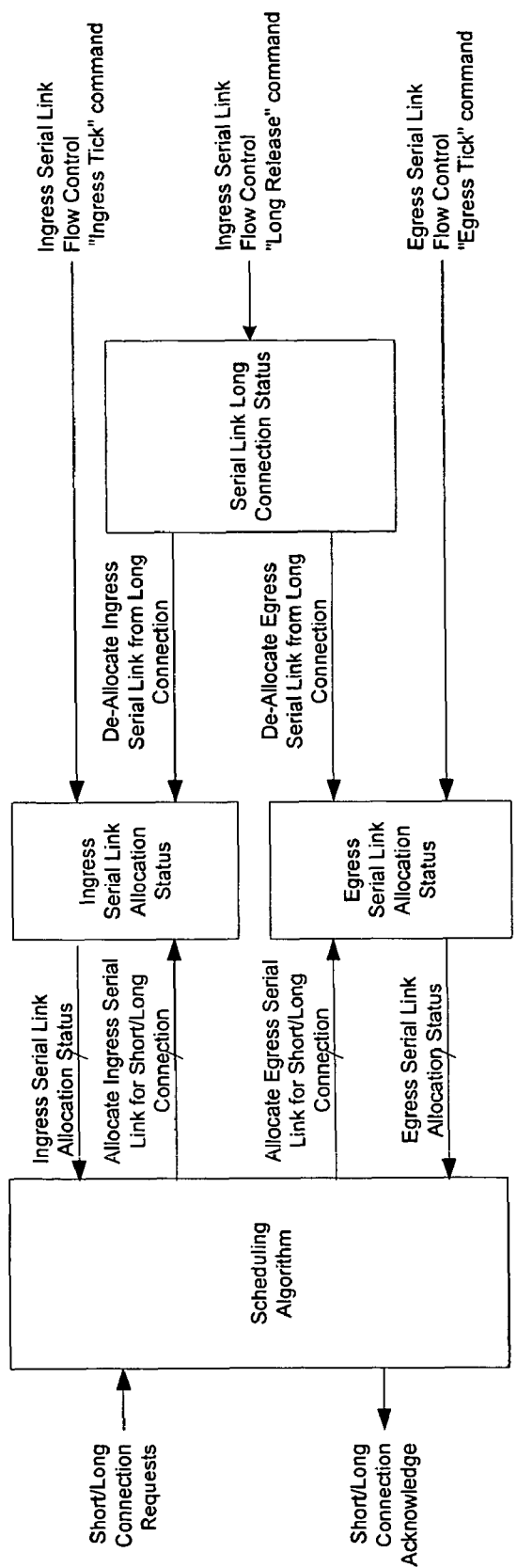
FIG. 14 shows the relationship between the scheduler's serial link status, scheduler algorithm, and ingress and egress serial link flow control, according to at least one aspect of the invention.
Figure 15:
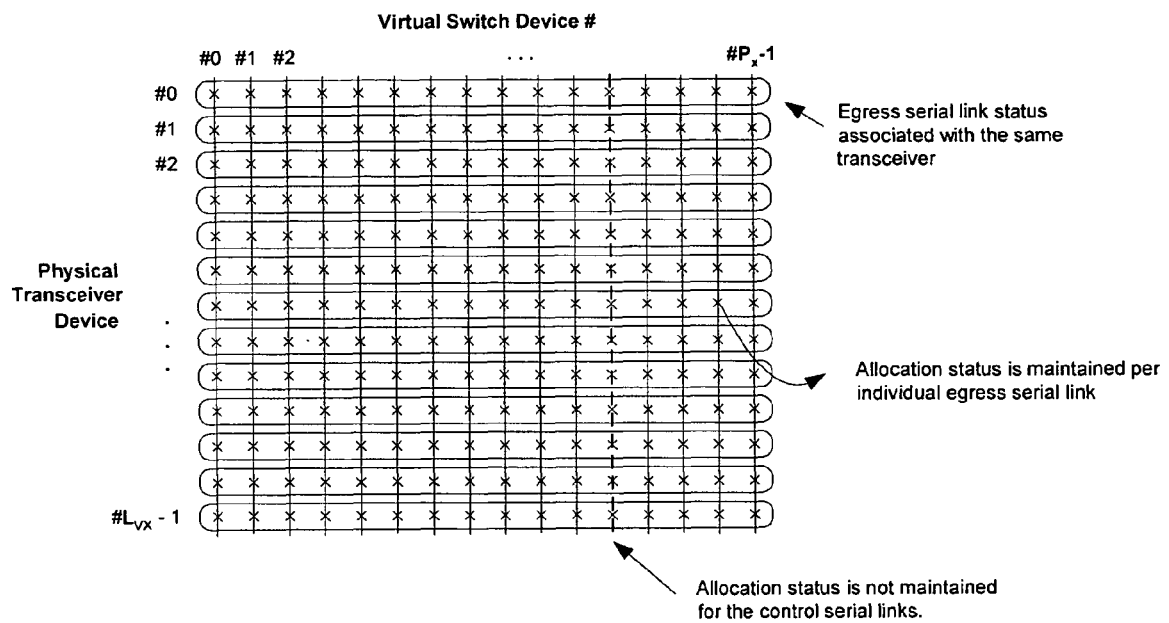
FIG. 15 shows an overview of the scheduler's egress serial link allocation status, according at least one aspect of the invention.

In FIG. 14, short/long connection requests are received by the scheduler, and processed according to a scheduler algorithm. The scheduler algorithm also receives information corresponding to ingress serial link allocation status, and egress serial link allocation status. Each ingress serial link allocation status receives ingress serial link flow control commands (ingress ticks, long release commands), and each egress serial link allocation status receives egress serial link flow control commands (egress ticks and long release commands). The scheduler algorithm uses the information it receives to generates connection acknowledges An example of an egress serial link allocation status maintained by a scheduler according to an embodiment of the invention is shown in FIG. 15. The allocation status per egress serial link tracks the allocation and de-allocation of the egress serial link for short and long connections. The allocation status is based on an integer variable named Timer, which is defined in the range from 0 to N. The resolution of Timer is equal to ($Tail_{Max}$+1), and N=T+$Long_{Min}$/($Tail_{Max}$+1). The scheduler algorithm can allocate the egress serial link for a new short/long connection when Timer≦T.

When the egress serial link is allocated for a long connection, Timer is assigned the value N. When the ingress serial link flow control releases the long connection, Timer is assigned a value of T if no Egress Tick has arrived while the connection was allocated, and a value of T+($ET_{Size}$/($Tail_{Max}$+1)) if one or more Egress Ticks arrived while the long connection was allocated. The ingress serial link flow control de-allocates long connections before their transmission is completed, such that there is a very high probability that the scheduler can find a match for a new short or long connection match before the transmission is completed. Thus, a new connection is guaranteed to be allocated back-to-back with the previous long connection on both the ingress and egress serial link even during worst case ILQ queue fill level scenarios.

When the egress serial link is allocated for a short connection, Timer is incremented with a value reflecting the size of the short connection. When Timer is not equal to N, it is per default periodically decremented at a rate equivalent to the transmission speed of the corresponding egress serial link to provide automatic expiration of short connections. When an egress serial link flow control Egress Tick command arrives, a number of decrements equivalent to $ET_{Size}$ are skipped.

Figure 16:
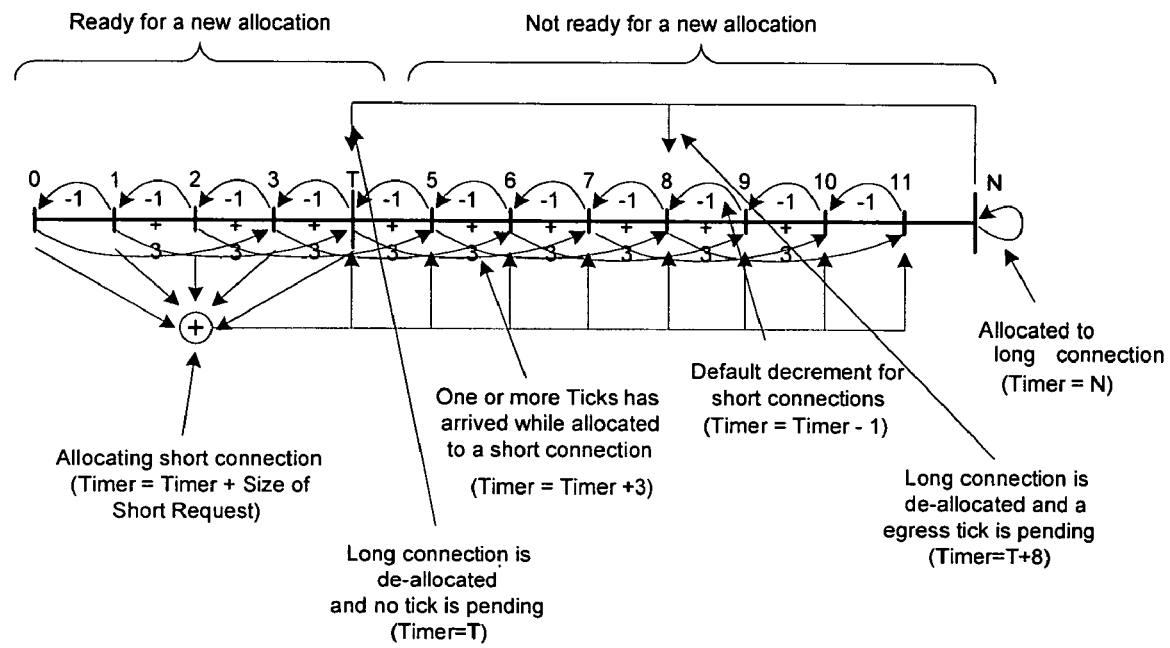
FIG. 16 shows how the scheduler's Egress Serial Link Allocation Status Timers operate, according to at least one aspect of the invention.

The value of T is dimensioned such that if there is a very high probability that the scheduler can find a new short or long connection match within a period of time equal to or smaller than T, the new connection will be allocated back-to-back with the previous connection on the egress serial link even during worst case ILQ queue fill level scenarios. An overview of how the Timer operates is shown in FIG. 16 for the following example:
a) $Tail_{Max}$=19B
b) T=4
c) $Long_{Min}$=160B
d) N=12
e) $ET_{Size}$=80B Two variables are preferably maintained per egress serial link in the system clock domain:
a) Timer, which tracks the allocation and de-allocation of the egress serial link for both short and long connections (implemented with $Log_2$(N+1) register bits).
b) EgressTick, which remembers if one or more Egress Ticks have arrived (implemented with 1 register bit).

The definition of how these variables are updated is shown in Table 3.

TABLE 3

Variable Updating Definition

| Event | Action |
|---|---|
| The scheduler allocates the egress serial link to a long connection. | Timer = N (long connection) |
| The scheduler allocates the egress serial link to a short connection. | Timer = Timer + ShortSize (length of short connection). |
| The scheduler de-allocates the long connection for which the egress serial link is currently allocated, based upon the reception of an ingress serial link flow control Long Release command. | Timer = N:<br>  If (EgressTick = 0):<br>    Timer = T<br>  If (EgressTick = 1):<br>    Timer = T + $ET_{Size}$ / $(Tail_{Max} + 1)$;<br>    EgressTick = 0. |
| Periodic timer event with a time interval equivalent to the transmission period of $(Tail_{Max} + 1)$ bytes on a serial link. | (Timer < N) and (EgressTick = 0):<br>  Timer = Timer − 1 (Timer > 0)<br>(Timer < N) and (EgressTick = 1):<br>  Timer = Timer + ($ET_{Size}$ / $(Tail_{Max} + 1)$ − 1);<br>  EgressTick=0. |
| An Egress Tick has arrived. | EgressTick = 1 |

Figure 17:
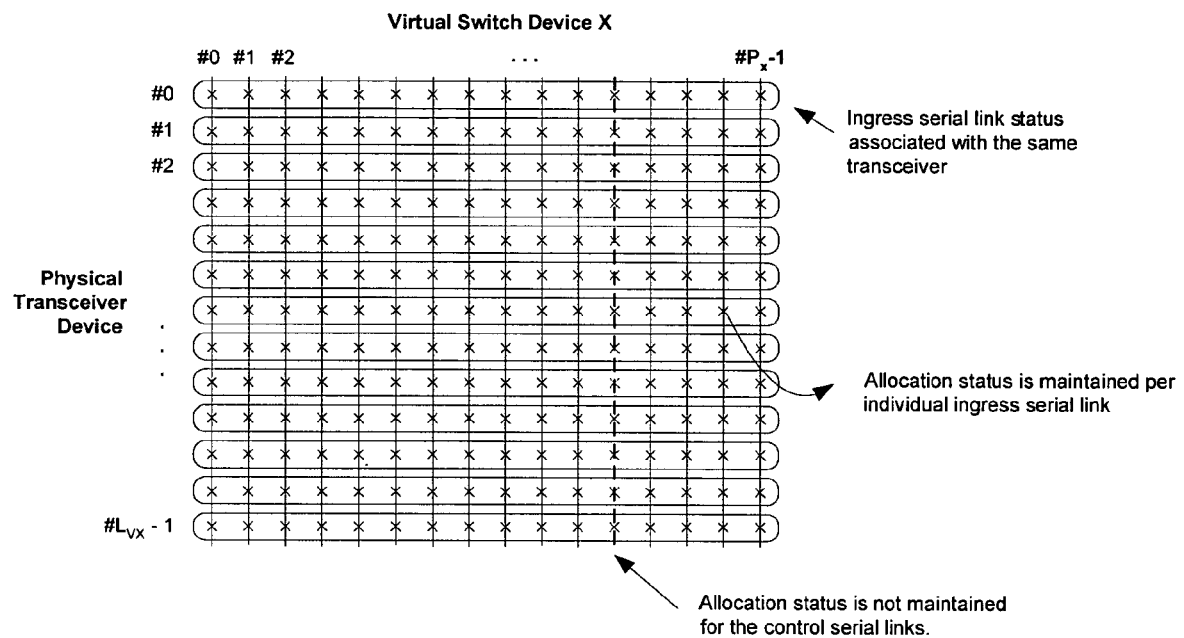
FIG. 17 shows an overview of the scheduler's ingress serial link allocation status, according to at least one aspect of the invention.

An example of an ingress serial link allocation status maintained by the scheduler according to an embodiment of the invention is shown in FIG. 17. The allocation status per ingress serial link tracks the allocation and de-allocation of the ingress serial link for short and long connections. The allocation status is based on an integer variable named Timer, which is identical to the equivalent Timer definition for egress serial link allocation in its range and resolution, and also the criteria for when the scheduler algorithm can allocate the ingress serial link for a new short/long connection.

When the ingress serial link is allocated for a long connection, Timer is assigned the value N. When the ingress serial link flow control releases the long connection, Timer is assigned a value of T.

When the ingress serial link is allocated for a short connection, Timer is incremented with a value reflecting the size of the short connection. When Timer is not equal to N, it is per default periodically decremented at a rate equivalent to the transmission speed of the corresponding ingress serial link to provide automatic expiration of short connections. When an ingress serial link flow control Ingress Tick command arrives, a number of decrements equivalent to $IT_{Size}$ are skipped.

Figure 18:
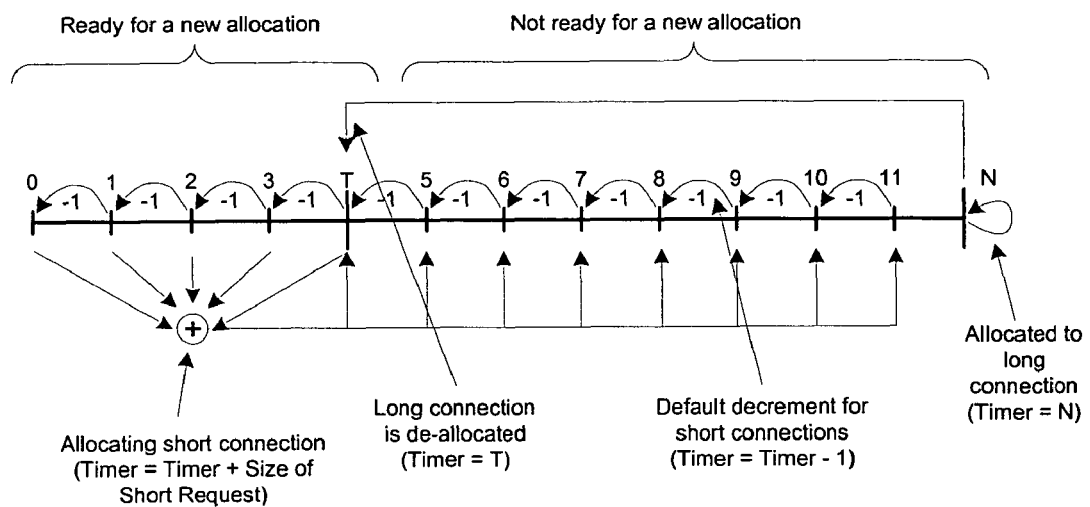
FIG. 18 shows how the scheduler's Ingress Serial Link Allocation Status Timers operate, according to at least one aspect of the invention.

The value of T is preferably dimensioned such that if there is a very high probability that the scheduler can find a new short or long connection match within a period of time equal to or smaller than T, the new connection will be allocated back-to-back with the previous connection on the ingress serial links. An overview of how the Timer operates is shown in FIG. 18 for the following example:

a) $Tail_{Max}$=19B
b) T=4
c) $Long_{Min}$=160B
d) N=12

The following variables are maintained per ingress serial link in the system clock domain:

a) Timer, which tracks the allocation and de-allocation of the egress serial link for both short and long connections (can be implemented using $Log_2(N+1)$ register bits).
b) LongAllocate, which detects if a long connection is never released due to a bit transmission error.

A definition of how these variables are updated is shown in Table 4.

TABLE 4

Definition of Variable Updating

| Event | Action |
|---|---|
| The scheduler allocates the ingress serial link to a long connection. | Timer = N (long connection) |
| The scheduler allocates the ingress serial link to a short connection. | Timer = Timer + ShortSize (length of short connection). |
| The scheduler de-allocates the long connection for which the ingress serial link is currently allocated. | Timer = N:<br>  Timer = T<br>  LongAllocate = 0 |
| Periodic timer event with a time interval equivalent to the transmission period of $(Tail_{Max} + 1)$ bytes on a serial link. When an Ingress Tick arrives, a number of timer events equivalent to $IT_{Size}$/$(Tail_{Max} + 1)$ are skipped. | (Timer < N) and (Timer > 0):<br>  Timer = Timer − 1 |
| ReleaseTimeout = 1 ReleaseTimeout is a global timer signal, which is used to ensure that long connections are de-allocated in the scenario that a ingress serial link flow control signal is lost due to an ingress serial link bit-error. | (Timer = N) and (LongAllocate = 0):<br>  LongAllocate = 1<br>(Timer = N) and (LongAllocate = 1):<br>  LongAllocate = 0.<br>  Timer = T.<br>  De-allocate the ingress and egress serial link which is allocated to the long connection.. |

Figure 19:
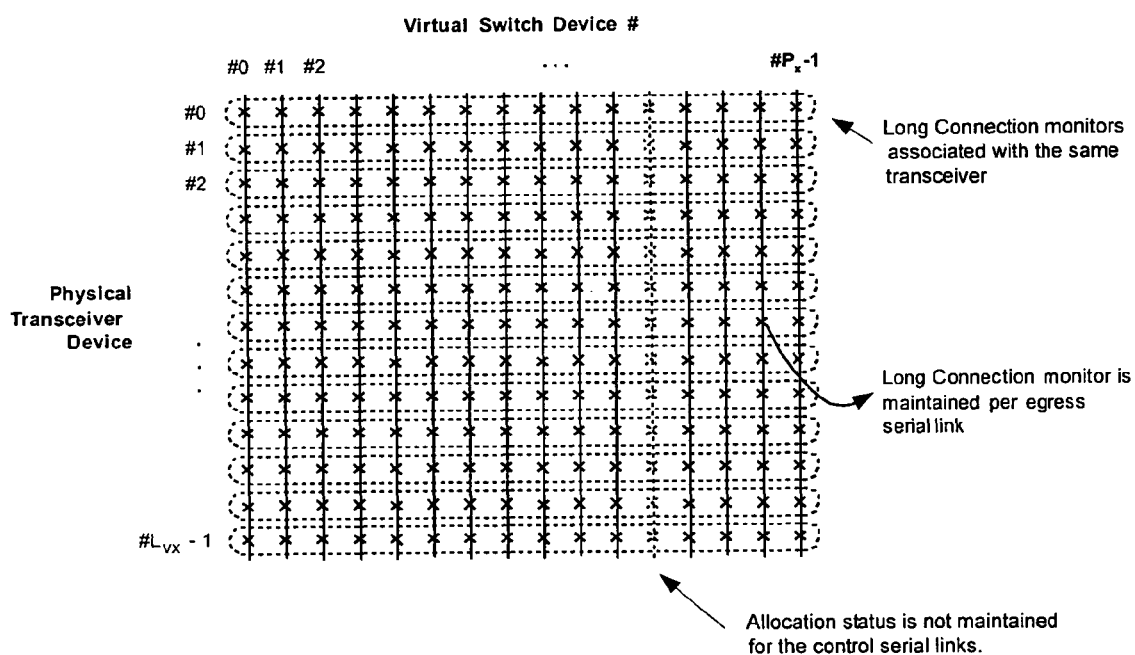
FIG. 19 shows an overview of the scheduler's long connection monitors, according to at least one aspect of the invention.

The scheduler tracks the allocated <ingress, egress> serial link pairs for long connections. The ingress serial link flow control Long Release command identifies which ingress serial link must be de-allocated for long connections, but the scheduler itself tracks which egress serial link was associated with the long connection and then de-allocate both the ingress and egress serial link. This is performed both for unicast and multicast connections. This is done using a monitor function per egress serial link. An overview of the monitors maintained by the scheduler is shown in FIG. 19.

Each time the scheduler allocates a <ingress serial link, egress serial link> pair for a long connection, the monitor associated with the allocated egress serial link is setup to point to the allocated ingress serial link. The monitor continuously tracks if an ingress serial link flow control Long Release command de-allocates the pointed-to ingress serial link. When this happens, the monitor function generates an egress serial link de-allocation command for the associated egress serial link.

Internal flow control messages operate for each ingress and egress serial link in the system. The ingress serial link flow control mechanism uses two signaling mechanisms:

Ingress Tick—compensates for tails accumulated during transmission of short packets.

Long Release—indicates the completion of long packet transmissions.

Figure 20:
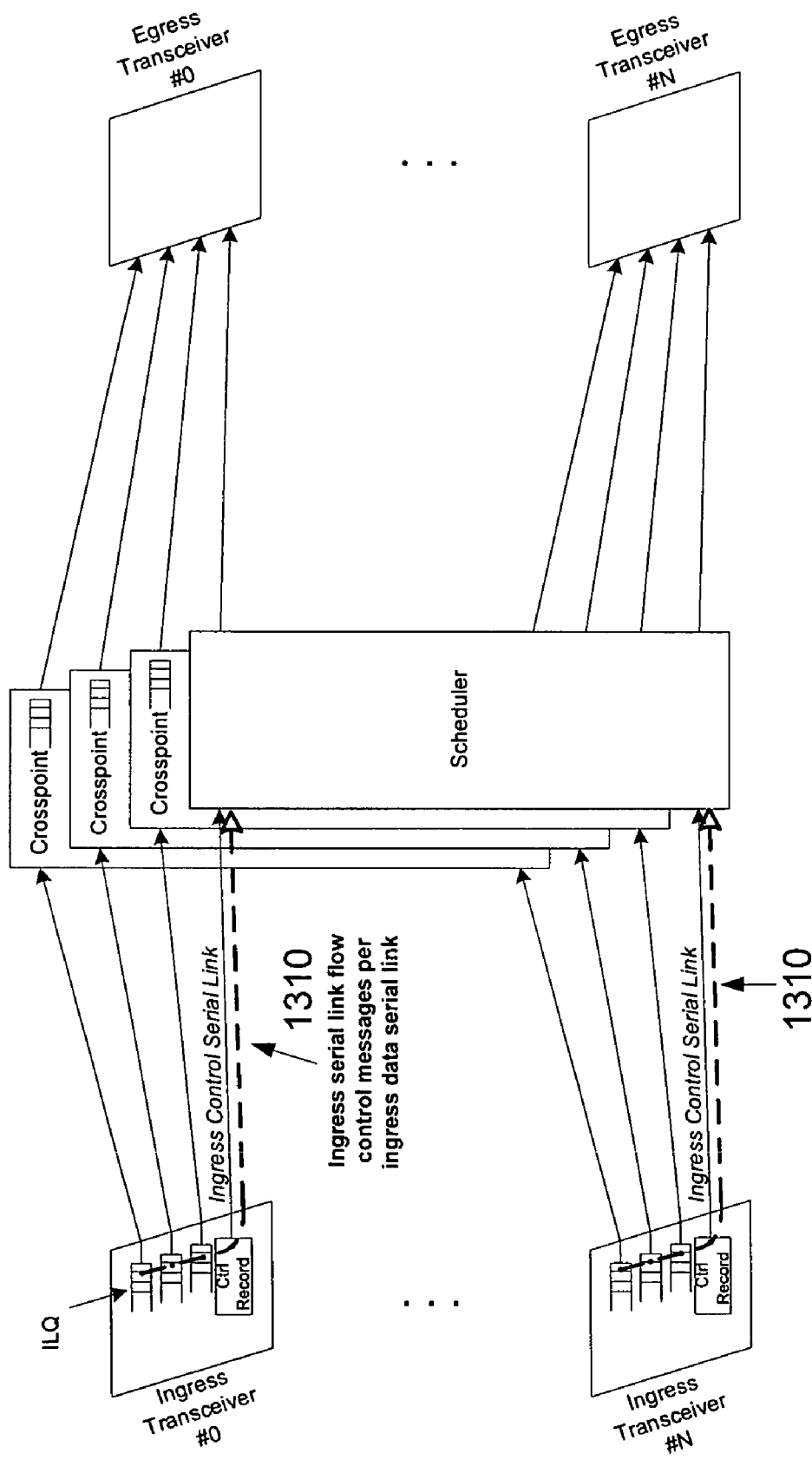
FIG. 20 shows the transmission path for ingress flow control signals, according to at least one aspect of the invention.

The transmission path 1310 for these two ingress serial link flow control signals is illustrated in FIG. 20.

The ingress transceiver generates a Long Release command for a specific ILQ when the following conditions are met:

a) A long packet is currently being streamed out of the corresponding ILQ queue.

b) $B_{ILQ} \leq T_{ILQ}$ with the EOP (end-of-packet) byte of the long packet being in the ILQ queue, where, $B_{ILQ}$=The current number of bytes in the ILQ queue.

$T_{ILQ}$=An ILQ queue threshold (bytes)

The following requirements are utilized to ensure back-to-back streaming of packets across both the ingress serial link and the egress serial link:

$T_{ILQ} \geq D_{LR\text{-}Data}$
$Long_{Min} \geq D_{LR\text{-}Data}$

Parameter $T_{ILQ}$ is preferably dimensioned to be as small as possible, to reduce worst case delay variation across the ILQ structures since this delay increases the worst case number of colliding packets in the crosspoint CQ. The dimensioning of $T_{ILQ}$ is preferably made as follows: $T_{ILQ}=D_{LR\text{-}Data}$.

The Ingress Tick flow control command is used to compensate for the over-allocation of the ingress serial links, which occurs when packet tails are greater than zero. When the scheduler generates a short acknowledge, it inserts the current ingress serial link allocation status into the acknowledge message. When the ingress transceiver processes the acknowledge, the allocation status provided by the scheduler is compared with the actual fill level of the ILQ, to determine if an Ingress Tick command should be generated to compensate for ILQ accumulation. This can occur when the packet tails are greater than zero. When an Ingress Tick arrives at the scheduler, it causes the scheduler to halt allocation of the corresponding ingress serial link for a period of time equivalent to $IT_{Size}$ on the ingress serial link. The ingress transceiver generates one or more Ingress Ticks for a specific ILQ when an acknowledge for a short packet arrives at the ingress transceiver and the following condition is met:

$BILQ+PTail>Acknowledge.Timer+PTicks$, where,

BILQ=Number of bytes in the ILQ queue before the short packet is added.
PTail=Size of the short packets tail.
Acknowledge.Timer=The ingress serial link allocation status (Timer) right before the scheduler made the scheduler decision for the short connection (Timer T) multiplied by the Timer unit which is (TailMax+1).
PTicks=Number of previous generated Ingress Ticks, which have not yet expired multiplied by ITSize. A previous generated Ingress Tick expires after a period of DTick-Ack, and it is the ingress transceiver, which tracks the expiration of previous Ingress Ticks per ingress serial link.

The number of generated Ingress Ticks is:

Ingress Ticks=$(B_{ILQ}+P_{Tail}-\text{acknowledge.Timer}-P_{Ticks})\text{div}IT_{Size}$.

The egress serial link flow control mechanism uses one signaling mechanism:

Egress Tick—compensates for tails accumulated during transmission of short packets.

Figure 21:
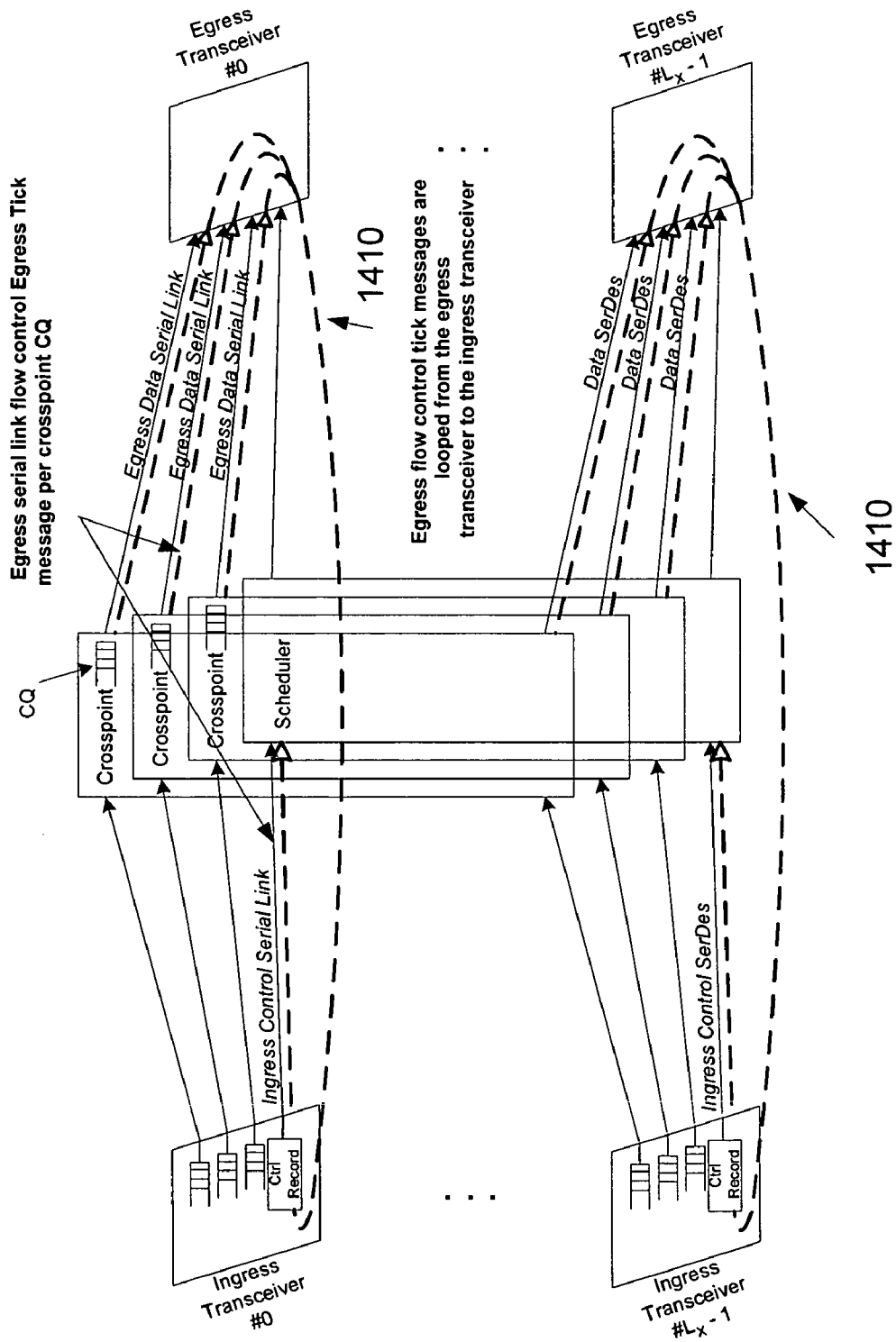
FIG. 21 shows the transmission path for egress flow control signals, according to at least one aspect of the invention.

An egress serial link flow control message is referred to as a 'Egress Tick'. The transceiver collects the Egress Tick messages from the parallel crosspoints, and forwards the information in control record format to the scheduler. To minimize CQ size requirements and worst-case crosspoint packet traversal latency, the flow control loop latency is preferably minimized. The transmission path 1410 for the Egress Tick flow control messages is illustrated in FIG. 21.

When a Egress Tick message arrives at the scheduler, it causes the scheduler to halt allocation of the corresponding egress serial link for a period of time equivalent to $ET_{Size}$ on the crosspoint egress serial link, and a continuous stream of Egress Tick messages will therefore halt the scheduling of any unicast traffic to the corresponding egress serial link.

The following three (3) conditions triggers the generation of an Egress Tick flow control message:

$B_{CQ} \geq T_{CQ}$, and at least $M_{CQ}$ bytes has been transmitted since the last Egress Tick.
$B_{CQ} \geq D_{CQ}$, and at least $M_{CQ}$ bytes has been transmitted since the last Egress Tick.
$B_{CQ} \geq 2 \times ET_{Size}$, and at least $2 \times D_{CQ}$ bytes has been transmitted since the last Egress Tick where,
  $B_{CQ}$=The current number of bytes in the CQ queue.
  $T_{CQ}$ is an integer variable that is incremented by $ET_{Size}$ when condition 1 below is true, and $T_{CQ}$ is decremented by $ET_{Size}$ when
  $B_{CQ}<T_{CQ}-ET_{Size}$, but $T_{CQ}$ can never be assigned a value less then $2 \times ET_{Size}$ which is also the reset value of $T_{CQ}$.
  $M_{CQ}$ is an integer with a value slightly lower than $ET_{Size}$ to ensure that back-to-back generated Egress Ticks over a long period of time will completely halt the allocation of the serial link throughout that entire period of time. This is done due to small ppm differences in clock frequency between the transceiver and crosspoint device and non-deterministic latency in the forwarding of tick signals across clock domains in the transceiver.

Conditions 2 and 3 are used because the scheduler only remembers one Egress Tick at a time, and Egress Ticks may therefore be 'lost' upon arrival at the scheduler if the serial link by then is allocated for a long connection.

A connection oriented scheduler approach is utilized in a preferred construction of the first embodiment, in which, when a packet is to be switched across a switch device, a connection is first established. In this context, a "connection" means a switch path between an ingress transceiver and an egress transceiver through a crosspoint. Once the connection is established, at least one packet is streamed across the connection, and then the connection is removed. This is different than a conventional crosspoint scheme whereby packets are switched on a time slotted basis. Ideally, if there were no physical implementation constraints, the system would only have long packets that result in long connections. However, because some packets to be switched are relatively small in size, the physical amount of time it takes to establish a connection and remove it again and communicate that handshake back and forth between the scheduler and the transceiver, may take longer than the actual transmission of the relatively shorter packets. Accordingly, the first embodiment of the invention supports short connections as well as long connections, where these respective connections are allocated differently. The long connection is established for as long as the connection is needed. The short connection, on the other hand, is allocated for only a predetermined amount of time.

Figure 22:
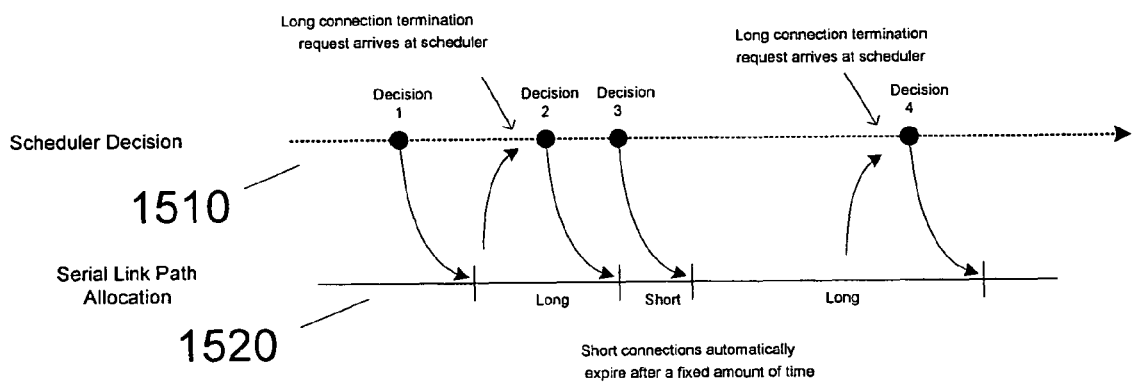
FIG. 22 shows a Scheduler Decision Time Line versus a Serial Link Path Allocation Time Line, according to at least one aspect of the invention.

FIG. 22 shows a Scheduler Decision Time Line 1510 versus a Serial Link Path Allocation Time Line 1520, whereby a scheduler decision is made, and then the corresponding connection is allocated on a serial link path. In the example shown in FIG. 22, the scheduler makes a first decision (Decision 1) that it is to establish a long connection to provide a switching path for a long packet. A long connection termination request is received at the scheduler, which effectively notifies the scheduler that the packet has been switched, and that the allocated long connection serial link path can be closed. In the next scheduling decision, Decision 2, in which the scheduler performs a scheduling decision for a short packet, the scheduler assigns a short connection for a fixed amount of time on an allocated serial link. When that period of time has expired, the connection is removed by the scheduler itself, and the allocated serial link path is then again made available for upcoming scheduling switching decisions. Another long connection is allocated, as Decision 3, by the scheduler, whereby this long connection is scheduled to start right after the short connection automatically expires, since the scheduler knows the exact time that the first short connection expires and does not receive any connection tear-down acknowledgement from the ingress transceiver. After that, another long or short connection is made, as Decision 4.

In a preferred construction of the first embodiment, the long connection termination request is output by the corresponding ingress serial link flow control function a short amount of time before the actual time that the long connection packet has finished being switched over the allocated ingress serial link, essentially ignoring the packet tail, to thereby ensure that packets are switched back-to-back against each other on the ingress and egress serial links.

In one possible implementation of the first embodiment, for short packets, the so-called predetermined short connections, the amount of time that the ingress transceiver will request for a connection excludes any potential tail of the short packet. For example, if the embodiment defines $Tail_{Max}$ as 19 bytes, for a 99 byte short packet the ingress transceiver will request a short connection for a period of time equivalent to the transmission period of only 80 bytes, whereby the 19 byte packet tail is effectively ignored by the scheduler.

The packet tails ignored by the scheduler may accumulate at the ILQs on the ingress serial link side and at the CQs on the egress serial link side, whereby the structure of the ILQs and the CQs allows for absorbing the packet collisions and to output the packets back-to-back across the serial links, to thereby achieve byte-level granularity even though the scheduler can only operate with a cell-magnitude decision cycle.

An egress serial link flow control for adjusting for packet tail accumulation that may occur in a crosspoint queue, according to a first embodiment of the invention, is described below, with reference to FIG. 21. When the packet tails from adjacent packets start overlapping with each other at an egress serial link and whereby a CQ begins to fill up, a flow control message, referred to herein as an Egress Tick, is output by the CQ where the packet overlapping is occurring. The Egress Tick is provided to the scheduler by the transceiver of the destination packet. The Egress Tick causes the scheduler to force the corresponding egress serial link on the crosspoint idle for a fixed period of time. In one implementation, each Egress Tick causes an 80 byte idle time for the particular egress serial link that provided that Egress Tick to the scheduler. The idle time amount can be changed to suit a particular system, whereby a 40 byte Egress Tick or a 120 byte Egress Tick could be utilized, for example.

The flow control Egress Tick signal is transported from the crosspoint to the scheduler by it first being sent to an egress transceiver from the congested CQ of the crosspoint, which is then looped to the corresponding ingress transceiver which sends it to the scheduler. In a preferred construction, there is no direct electrical path between the crosspoint queue and the scheduler, whereby only the transceivers directly communicate with the scheduler.

Similar to the egress side, if packet tails from two of more packets collide at an ingress serial link, that collision is absorbed by the corresponding ILQ on that ingress serial link. This happens because the scheduler does not consider packet tails when it allocates ingress serial links, similar to the scheduler's allocation of egress serial links.

When a certain amount of accumulation occurs at an ILQ, it sends a flow control signal, referred to herein as an Ingress Tick, to the scheduler to thereby force the corresponding egress link idle for a certain period of time, so as to allow the ILQ to alleviate its congestion. In a preferred construction, each Ingress Tick flow control message forces the corresponding link idle for a period of time that is equivalent to 20 bytes. Alternatively, another amount of idle time, such as 40 or 80 bytes, can be utilized for a single Ingress Tick, depending upon the particular implementation of the switch device. FIG. 20 shows an ingress serial link flow control according to the first embodiment, whereby an Ingress Tick is sent directly from a congested ILQ of an ingress transceiver to the scheduler, whereby the scheduler reserves an idle time for that ingress serial link to allow the congested ILQ to alleviate its congestion.

Figure 23:
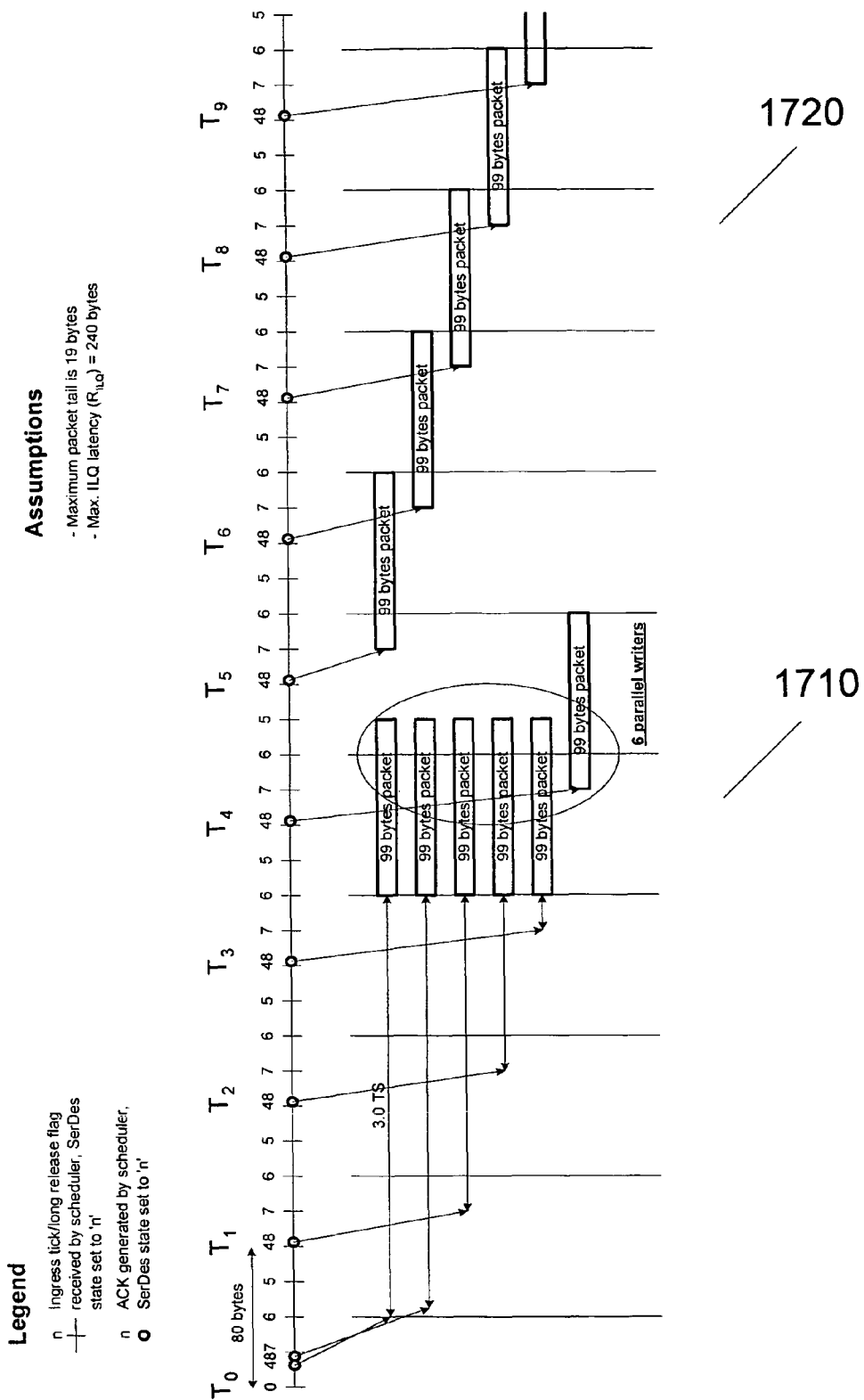
FIG. 23 shows a time line example of worst-case CQ contention, according to at least one aspect of the invention.

The left side portion 1710 of FIG. 23 shows an example whereby worst-case CQ contention occurs for an ILQ and a CQ, assuming a $Tail_{Max}$ value of 19 bytes. The time line at the top of FIG. 23 is broken down into 80-byte chunks. At time T0, the scheduler schedules a first and a second 99-byte packet from two different ingress transceivers to be send across the crosspoint unit to the same egress transceiver, whereby there is a delay in those packets exiting from their respective ILQs along the path to the CQ that is coupled to the allocated egress transceiver. This ILQ delay is the worst case equivalent to a current ILQ fill level of $R_{ILQ}$ bytes.

At time T1, the scheduler schedules a third 99-byte packet to be sent across the crosspoint unit to the same egress transceiver, whereby the delay or latency in outputting that third 99-byte packet from the respective ILQ of its ingress serial link along a path to the CQ that is coupled to the allocated egress serial transceiver is less than the delay for the first and second 99-byte packets. Similarly, at time T2 and at time T3, fourth and fifth 99-byte packets are scheduled by the scheduler to be switched across the crosspoint unit to make their way to the same CQ that is coupled to the same allocated egress transceiver, respectively, whereby the fourth and fifth 99-byte packets have a shorter delay time in their respective ILQs than the other packets previously scheduled by the scheduler for that same egress transceiver.

At a time T4, a sixth 99-byte packet is scheduled by the scheduler to go to the same egress transceiver, whereby, in the worst case, the delay in outputting that sixth 99-byte packet from the respective ILQ of its ingress serial link along a path to the CQ that is coupled to the allocated egress serial transceiver is virtually non-existing. Accordingly, the CQ of the crosspoint unit receives six separate 99-byte packets overlapping each other, and consequently the CQ is capable of storing each of these six separate 99-byte packets in a respective one of its six lanes simultaneously to avoid packet data loss at the CQ even in this worst-case scenario. Of course, one of ordinary skill in the art will recognize that the number of lanes for the CQ is configurable for any given implementation.

At this point, in the right side portion 1720 of FIG. 23, each packet scheduled by the scheduler to go to the same egress transceiver is output from its respective ILQ at the same fill level, whereby only the overlap between adjacent packets received at the CQ exists due to the 19 byte packet tails that are not considered by the scheduler when it makes its scheduling decisions. In this example, only two of the CQ lanes are utilized in order to cope with the overlapping packets arriving at the CQ at the same time, and again no data is lost at the egress serial link side.

Thus, methods and apparatuses have been described according to the present invention. Many modifications and variations may be made to the techniques and structures described and illustrated herein without departing from the spirit and scope of the invention. Accordingly, it should be understood that the methods and apparatuses described herein are illustrative only and are not limiting upon the scope of the invention. For example, while the preferred embodiments have been described with respect to a transceiver device corresponding to a linecard on a one-to-one basis, the present invention is also applicable to a case whereby a single linecard can implement more than one ingress or egress transceiver device. Furthermore, the present invention is also applicable to a case whereby all of the transceivers and switch components of a network switching device are implemented on a single card (e.g., a single printed circuit board). For example, in that case, all of the components shown in FIG. 6 would be implemented on a single card. Moreover, any one or more aspects shown and described herein may be practiced individually in any given system, or may be practiced together with one or more other aspects, including practicing all non-conflicting aspects in a single system. Further, the present invention may be implemented in any type of switching system for any type of network.

What is claimed is:

1. A switching device configured to communicatively connect one of a plurality of input transceivers to one of a plurality of output transceivers, the switching device comprising:
   a crosspoint matrix having a plurality of inputs for receiving variable-sized packets from respective input transceivers and a plurality of outputs;
   a plurality of output queues, each output queue coupled to all of the plurality of outputs of the crosspoint matrix and to an input of a respective one of the output transceivers, each output queue configured to simultaneously store overlapping portions of two or more variable-sized packets output from two or more outputs of the crosspoint matrix; and
   a scheduler to schedule the variable-sized packets across the crosspoint matrix,
   wherein the scheduler allocates a connection time for each variable-sized packet that excludes packet tails, and
   wherein the output queues absorb collisions between variable-sized packets by simultaneously storing overlapping portions of two or more packets output from two or more outputs of the crosspoint matrix.

2. The switching device according to claim 1, wherein the switching device is capable of operating in either a crosspoint mode or a scheduler mode, in which the crosspoint mode utilizes the crosspoint matrix and not the scheduler, and in which the scheduler mode utilizes the scheduler and not the crosspoint.

3. The switching device according to claim 1, wherein each of the plurality of output queues is configured to output the variable-sized packets back-to-back to the corresponding one of the output transceivers.

4. The switching device according to claim 1, wherein each of the plurality of input transceivers comprises:
   a plurality of input FIFOs,
   wherein each of said plurality of input FIFOs is configured to store the variable-sized packets and to output the variable-sized packets to said crosspoint matrix, and
   wherein each of said plurality of input FIFOs is configured to absorb overlapping portions of at least two variable-sized packets that are scheduled by the scheduler to be output from one of said input FIFOs and thereby through the switching device.

5. The switching device according to claim 4, wherein the scheduler schedules each of the variable-sized packets across the crosspoint matrix in one of:
   a) a short connection mode wherein the allocated connection time based on the packet size ignoring any packet tail, the short connection mode used when the variable-sized packet to be transferred across the crosspoint matrix is less than a predetermined size, and
   b) a long connection mode wherein the connection is allocated for an indeterminate time, the long connection mode used when the variable-sized packet to be transferred across the crosspoint matrix is greater than or equal to the predetermined size.

6. The switching device according to claim 5, wherein a packet long connection termination message indicating an end of a packet transmission is output by a corresponding one of said plurality of input FIFOs at a predetermined time before transferring the variable-sized long packet from the one of said plurality of input FIFOs to the crosspoint matrix has been completed.

7. The switching device according to claim 5, wherein
   in the short connection mode, the output queue outputs each variable size packet received from the crosspoint matrix as soon as a portion of the variable size packet is stored in the output queue, and
   in the long connection mode, the output queue does not output each variable size packet received from the crosspoint matrix until at least a predetermined amount of the variable size packet is received and stored in the output queue.

8. The switching device according to claim 1, further comprising:
   a plurality of ingress serial links connecting respective input transceivers to the crosspoint matrix; and
   a plurality of egress serial links connecting the outputs of respective output queues to the inputs of corresponding output transceivers.

9. The switching device according to claim 8, further comprising:
   a monitor unit configured to, when the scheduler allocates an ingress serial link/egress serial link pair for a long connection, continuously track whether or not an ingress serial link flow control Long Release command deallocates the ingress serial link in the pair, and when the ingress serial link flow control command for deallocating the ingress serial link is detected by the monitor unit, to generate an egress serial link deallocation command for deallocating the egress serial link in the pair.

10. The switching device according to claim 8, further comprising:
    a monitor unit configured to, when the scheduler allocates an ingress serial link/egress serial link pair for a long connection, continuously track whether or not an egress serial link flow control command deallocates the egress serial link in the pair, and when the egress serial link flow control command for deallocating the egress serial link is detected by the monitor unit, to generate an ingress serial link deallocation command for deallocating the ingress serial link in the pair.

11. The switching device according to claim 8, further comprising, wherein the scheduler is configured to allocate an ingress serial link/egress serial link pair for a long connection based on a packet size being greater than a predetermined packet size, the network switching system further comprising: a monitor unit configured to continuously track if an ingress serial link flow control Long Release command deallocates the ingress serial link in the pair that it is currently pointing to, and if so, the monitor being configured to generate an egress serial link de-allocation command for the egress serial link in the pair.

12. The switching device according to claim 1, wherein each output queue comprises:
    a plurality of lane buffers, each lane buffer configured to store at least a portion of a variable-sized packet output from the crosspoint matrix.

13. The switching device according to claim 12, wherein each plurality of lane buffers consists of five or six lane buffers.

14. The switching device according to claim 12, wherein each output queue further comprises:
- a write lane controller to provide a write pointer for simultaneously storing variable-sized packets in one or more lane buffer; and
- a read lane controller to provide a read pointer for retrieving a variable-sized packet from a selected one of the plurality of lane buffers.

15. A network switching system, comprising:
- at least one input path that is configured to receive variable-sized packets;
- a crosspoint matrix communicatively coupled to the at least one input path, the crosspoint matrix configured to route said variable-sized packets received at one of a plurality of inputs of the crosspoint matrix to one of a plurality of outputs of the crosspoint matrix; and
- a scheduler communicatively coupled to the crosspoint matrix and which is configured to schedule said variable-sized packets that are routed through the crosspoint matrix,
- wherein the scheduler schedules a connection time for each variable-sized packet that excludes packet tails, and
- wherein the scheduler is configured to determine whether or not a length of a variable-sized packet provided to the crosspoint matrix via the at least one input path is greater than a predetermined byte value, wherein the received variable-sized packet is determined to be a short packet if the length is less than or equal to the predetermined byte value and is determined to be a long packet if the length is greater than the predetermined byte value, and
- wherein the scheduler schedules a short packet by a connection-oriented scheme which allocates a connection time based on the packet length ignoring any packet tail for passing the short packet through the crosspoint matrix, and
- wherein the scheduler schedules a long packet by a connection-oriented scheme which allocates a path across the crosspoint matrix that is deallocated upon receipt of a packet termination message sent from a flow control of the at least one input path that supplied the long packet to the crosspoint matrix.

16. A network switching system, comprising:
- a plurality of virtual switching devices each configured to communicatively connect one of a plurality of input transceiver devices to one of a plurality of output transceiver devices, each of said plurality of virtual switching devices being capable of operating in a first crosspoint switching mode that includes:
  - a crosspoint matrix having a plurality of inputs for receiving variable-sized packets from the respective input transceiver devices and a plurality of outputs, and
  - a plurality of output queues, each output queue coupled to all of the outputs of the crosspoint matrix and to an input of a corresponding one of the output transceiver devices, each output queue configured to simultaneously store overlapping portions of two or more variable-sized packets output from two or more outputs of the crosspoint matrix,
- wherein the plurality of virtual switching devices correspond to a single physical switching device and,
- wherein the output queues absorb collisions between variable-sized packets by simultaneously storing overlapping portions of two or more packets output by the crosspoint matrix, whereby variable-sized packets are transferred through the crosspoint matrix without being converted into fixed-length cells.

17. The network switching system according to claim 16, wherein each of said plurality of virtual switching devices is also capable of operating in a second scheduler mode that includes a scheduler that schedules packets across at least one crosspoint matrix without regards to packet tails.

18. The network switching system according to claim 17, further comprising: means for allocating at least one of said virtual switching devices to operate in the second scheduler mode, and for allocating at least one other of said virtual switching devices to operate in the first crosspoint switching mode.

* * * * *